United States Patent
Palraj et al.

(10) Patent No.: US 12,166,732 B2
(45) Date of Patent: Dec. 10, 2024

(54) AUTOMATED OPT-IN CONVERSATION SYSTEMS

(71) Applicant: LIVEPERSON, INC., New York, NY (US)

(72) Inventors: Ponsivakumar Palraj, New York, NY (US); Kuntal Mehta, New York, NY (US)

(73) Assignee: LIVEPERSON, INC., New York, NY (US)

( * ) Notice: Subject to any disclaimer, the term of this patent is extended or adjusted under 35 U.S.C. 154(b) by 0 days.

(21) Appl. No.: 18/375,780

(22) Filed: Oct. 2, 2023

(65) Prior Publication Data

US 2024/0113990 A1  Apr. 4, 2024

Related U.S. Application Data

(60) Provisional application No. 63/412,764, filed on Oct. 3, 2022.

(51) Int. Cl.
*H04L 51/02* (2022.01)
*G06F 40/35* (2020.01)
*G06Q 30/0251* (2023.01)

(52) U.S. Cl.
CPC .............. *H04L 51/02* (2013.01); *G06F 40/35* (2020.01); *G06Q 30/0258* (2013.01)

(58) Field of Classification Search
CPC ......... H04L 51/02; H04L 51/04; G06F 40/35; G06Q 30/0258

USPC ........................................................ 709/206
See application file for complete search history.

(56) References Cited

U.S. PATENT DOCUMENTS

| | | | | |
|---|---|---|---|---|
| 10,848,619 | B2 * | 11/2020 | Huet | H04M 3/4931 |
| 2020/0099633 | A1 * | 3/2020 | D'Agostino | G06F 3/0481 |
| 2020/0312145 | A1 * | 10/2020 | Hintermeister | G09B 21/006 |
| 2020/0349614 | A1 * | 11/2020 | Batcha | H04M 3/5141 |
| 2021/0224858 | A1 * | 7/2021 | Khoury | G06Q 30/0276 |
| 2023/0106705 | A1 * | 4/2023 | Cheleotis | G06Q 20/145 718/104 |
| 2023/0289836 | A1 * | 9/2023 | Chopra | G06Q 30/0203 |
| 2023/0368105 | A1 * | 11/2023 | Brevoort | G06Q 10/0633 |

\* cited by examiner

*Primary Examiner* — Ruolei Zong
(74) *Attorney, Agent, or Firm* — POLSINELLI LLP

(57) ABSTRACT

Disclosed embodiments provide a framework for implementing automated bots configured to automatically and in real-time process messages exchanged with a user to determine whether to present an opt-in offer for supplemental communications. An agent bot processes ongoing messages exchanged in real-time during a first communications session as these messages are exchanged to determine whether to present an opt-in authorization request for supplemental communications. If the user approves the request, contact information associated with the user is used to facilitate a second communications session through which the user is prompted to provide an opt-in confirmation. The opt-in confirmation and the approval of the opt-in authorization request is provided to allow for transmission of the supplemental communications to the user.

21 Claims, 10 Drawing Sheets

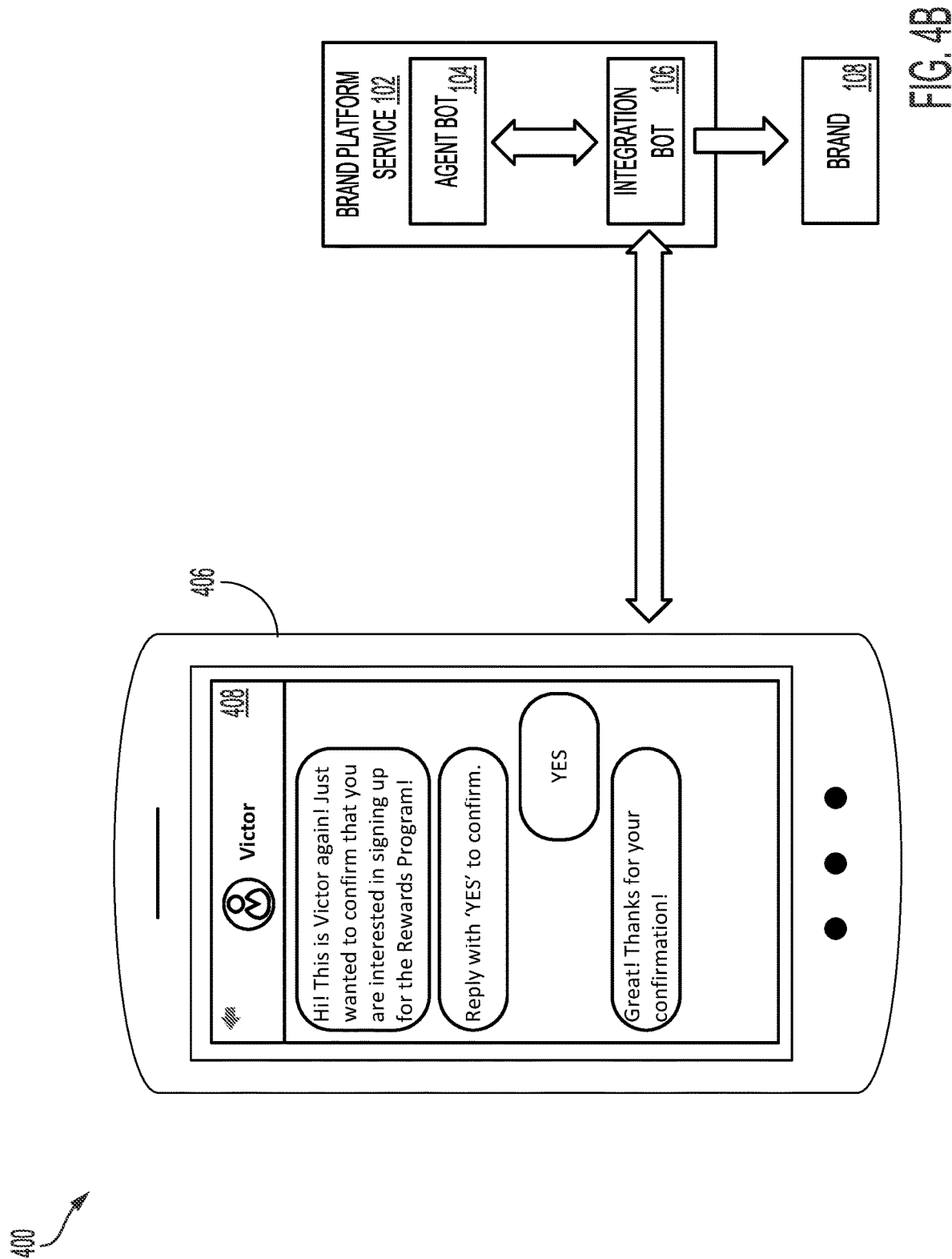

AUTOMATED OPT-IN CONVERSATION SYSTEMS

CROSS-REFERENCE TO RELATED APPLICATIONS

The present patent application claims the priority benefit of U.S. provisional patent application No. 63/412,764 filed Oct. 3, 2022, the disclosures of which are incorporated by reference herein.

FIELD

The present disclosure relates generally to systems and methods for implementing automated bots configured to automatically and in real-time process messages exchanged with a user to determine whether to present an opt-in offer for supplemental communications.

SUMMARY

Disclosed embodiments provide a framework for implementing automated bots configured to automatically and in real-time process messages exchanged with a user to determine whether to present an opt-in offer for supplemental communications. According to some embodiments, a computer-implemented method is provided. The computer-implemented method comprises dynamically detecting ongoing messages exchanged in real-time during a first communications session between a user and an agent bot. The computer-implemented method further comprises processing the ongoing messages in real-time as the ongoing messages are received to automatically determine whether to present an opt-in authorization request for supplemental communications. The opt-in authorization request includes a prompt for contact information associated with the user. The computer-implemented method further comprises generating an instruction to present the opt-in authorization request. When the instruction is received by the agent bot, the agent bot presents the opt-in authorization request through the first communications session. The computer-implemented method further comprises monitoring the first communications session in real-time to detect approval of the opt-in authorization request and a message including the contact information associated with the user. The computer-implemented method further comprises facilitating a second communications session according to the contact information. When the second communication session is facilitated, an integration bot transmits an opt-in confirmation request through the second communications session. The computer-implemented method further comprises receiving in real-time an opt-in confirmation responsive to the opt-in confirmation request through the second communications session. The computer-implemented method further comprises providing the approval of the opt-in authorization request and the opt-in confirmation. When the approval of the opt-in authorization request and the opt-in confirmation are received by a brand entity, the brand entity transmits the supplemental communications.

In some embodiments, the computer-implemented method further comprises identifying in real-time an intent corresponding to the ongoing messages. The intent is used to automatically determine whether to present the opt-in authorization request.

In some embodiments, the first communications session and the second communications session are distinct.

In some embodiments, the computer-implemented method further comprises activating the integration bot in response to the agent bot presenting the opt-in authorization request through the first communications session. When the integration bot is activated, the integration bot automatically monitors the first communications session to detect the approval of the opt-in authorization request.

In some embodiments, the contact information corresponds to a phone number associated with the user. Further, the second communications session is facilitated using Short Message Service (SMS) messages.

In some embodiments, the computer-implemented method further comprises dynamically updating the agent bot in real-time based on the ongoing messages, the approval of the opt-in authorization request, and the opt-in confirmation.

In some embodiments, the first communications session is transferred to the agent bot from a live agent based on an intent associated with previous messages exchanged between the user and the live agent over the first communications session.

In an example, a system comprises one or more processors and memory including instructions that, as a result of being executed by the one or more processors, cause the system to perform the processes described herein. In another example, a non-transitory computer-readable storage medium stores thereon executable instructions that, as a result of being executed by one or more processors of a computer system, cause the computer system to perform the processes described herein.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

The present disclosure is described in conjunction with the appended Figures:

FIGS. 4A-4C show an illustrative example of an environment in which a user, through different communications channels, is provided with an opt-in offer and with a request to confirm acceptance of the opt-in offer in order to allow a brand to provide supplemental communications to the user in accordance with at least one embodiment;

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred examples of embodiment(s) only and is not intended to limit the scope, applicability or configuration of the disclosure. Rather, the ensuing description of the preferred examples of embodiment(s) will provide those skilled in the art with an enabling description for implementing a preferred examples of embodiment. It is understood that various changes can be made in the function and arrangement of elements without departing from the spirit and scope as set forth in the appended claims.

Figure 1:
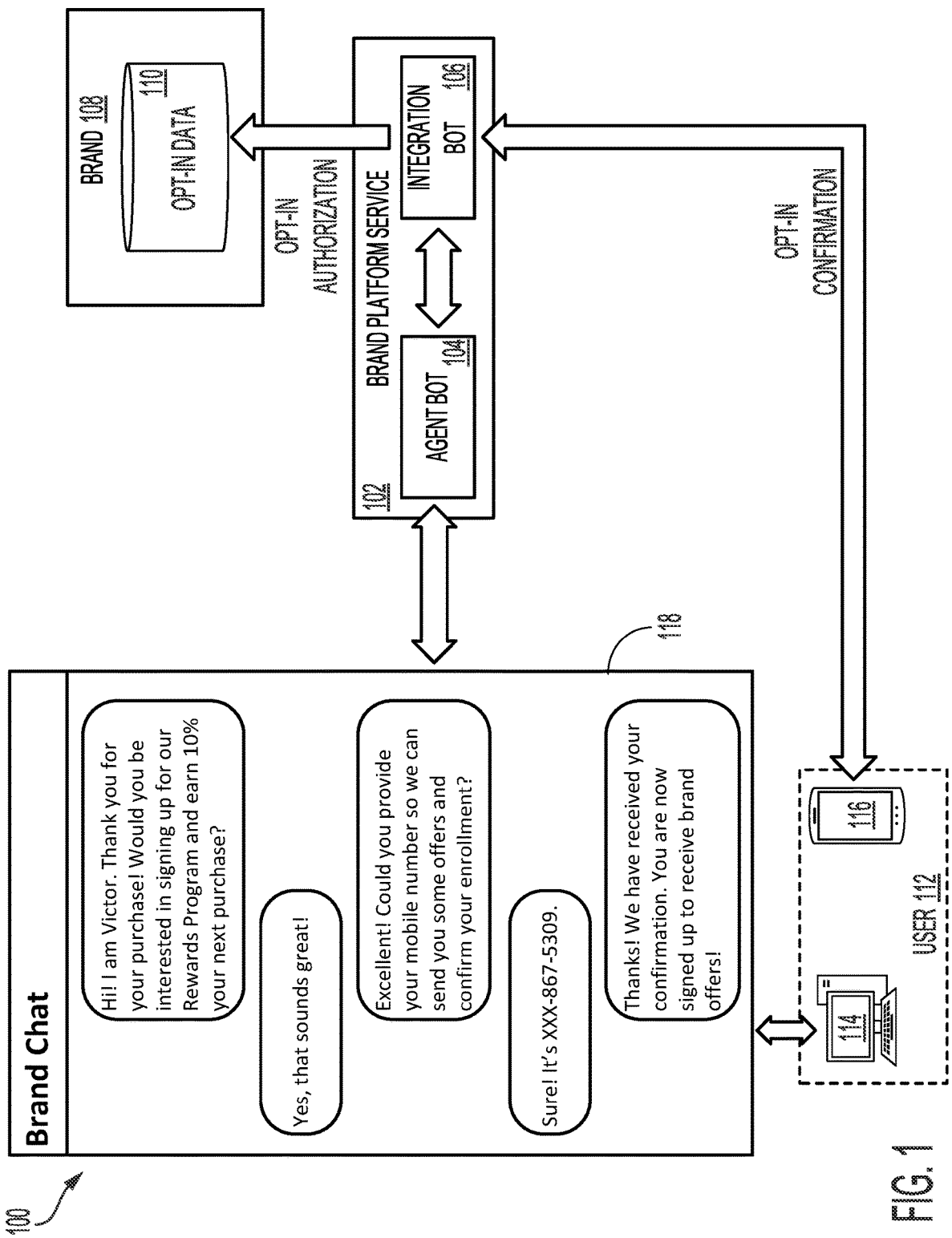
FIG. 1 shows an illustrative example of an environment in which a brand platform service, through implementation of an agent bot and an integration bot, obtains an opt-in authorization associated with a user for communications from a brand in accordance with at least one embodiment.

FIG. 1 shows an illustrative example of an environment 100 in which a brand platform service 102, through implementation of an agent bot 104 and an integration bot 106, obtains an opt-in authorization associated with a user 112 for communications from a brand 108 in accordance with at least one embodiment. In the environment 100, a brand platform service 102 facilitates a communications session 118 between a user 112 and an agent bot 104 implemented by the brand platform service 102. The brand platform service 102 may be an entity that provides, operates, or runs an online service for providing assistance to users associated with a brand 108 or other organization that provides services and/or goods to its users, such as user 112. For instance, the brand platform service 102 may provide user support on behalf of the brand 108 or other organization. In some embodiments, the brand platform service 102 is provided by the brand 108 or other organization to process requests and/or issues submitted by users associated with the brand 108.

As illustrated in FIG. 1, the brand platform service 102 may implement an agent bot 104. The agent bot 104 may be an automated process that is implemented or dynamically trained to communicate with users associated with the brand 108 in order to provide support or information to these users regarding an online service (e.g., information about products available at an online store) and/or to address any issues or requests submitted by a user 112 (e.g., requests for refunds, troubleshooting requests, etc.). The user 112, in some instances, can be an individual shopping an online store from a personal computing device 114, a brand 108 can be a company that sells products online (such as through an online marketplace), and the agent bot 104 can be implemented by the brand platform service 102 to communicate with the user 112 to provide information and/or support with regard to the products being sold online by the brand 108.

In an embodiment, the brand platform service 102 provides, such as through a website or application implemented by the brand 108 or otherwise associated with the brand 108

(e.g., an online marketplace through which goods/services associated with the brand 108 are provided, a website or application implemented by the brand platform service 102 on behalf of the brand 108, etc.), an option through which a user 112 may submit a request to initiate a communications session 118 with the agent bot 104. For example, through an interface (e.g., graphical user interface (GUI)) provided through the website or application, the brand platform service 102 may provide the user 112 with an option to initiate a communications session 118 with the agent bot 104.

In some instances, the option to initiate the communications session 118 with the agent bot 104 may be presented to the user 112 according to contextual information obtained through user interaction with the website or application. For example, the brand platform service 102 may automatically, and in real-time, monitor user interaction with the website or application to determine whether to present the option to initiate the communications session 118. For instance, if the user 112, through their personal computing device 114, navigates to a checkout page for the purchase of one or more items provided by the brand 108, the brand platform service 102 may automatically present the option to initiate the communications session 118 with the agent bot 104 within the checkout page. As another illustrative example, if the user 112 remains within a particular page within the website or application for a pre-defined period of time (e.g., thirty seconds, one minute, five minutes, etc.), the brand platform service 102 may detect that the user 112 has been idle for this pre-defined period of time and automatically present the option to initiate the communications session 118 with the agent bot 104.

In an embodiment, the brand platform service 102 dynamically trains, in real-time or near real-time, a machine learning algorithm or artificial intelligence to automatically determine whether to present the user 112 with an option to initiate the communications session 118 with the agent bot 104. The machine learning algorithm or artificial intelligence may be trained using supervised training techniques. For instance, the machine learning algorithm or artificial intelligence may be trained using a dataset that includes sample interactions (e.g., historical interactions between users and bots, hypothetical or artificial interactions between users and bots, etc.) and feedback (e.g., historical responses, hypothetical or artificial responses, etc.) corresponding to the presentation (or lack thereof) of the option to initiate a communications session with an agent bot. As an illustrative example, an evaluator of the machine learning algorithm or artificial intelligence (e.g., an administrator of the brand platform service 102, entities associated with the brand 108, independent parties introduced to perform such evaluations, etc.) may review the feedback pertaining to presentation (or lack thereof) of the option to initiate a communications session with an agent bot to determine, based on the sample interactions with the website or application, whether the option should or should not have been presented. In some instances, an evaluator may act as a user that may interact with the website or application in different ways to determine whether the machine learning algorithm or artificial intelligence is accurately providing (or not providing) the option to request initiation of a communications session with the agent bot 104.

Based on this feedback, the machine learning algorithm or artificial intelligence may be re-trained to more accurately determine whether to provide users with the option to initiate a communications session with an agent bot 104. For instance, the machine learning algorithm or artificial intelligence may be re-trained, in real-time, by updating a set of model coefficients $\{\alpha_1, \alpha_2, \alpha_3, \ldots \alpha_n\}$ corresponding to the different variables associated with the model inputs (e.g., the dataset of sample interactions, outputs (presentation or lack thereof of an option), and corresponding feedback) to generate an updated machine learning algorithm or artificial intelligence. The updated machine learning algorithm or artificial intelligence may be evaluated in real-time using the updated dataset of sample interactions and corresponding feedback as new interactions amongst different users, different agent bots, and different integration bots occur to improve the accuracy of the machine learning algorithm or artificial intelligence in making decisions with regard to providing (or not providing) options to request initiation of communications sessions with agent bots.

Figure 4A:
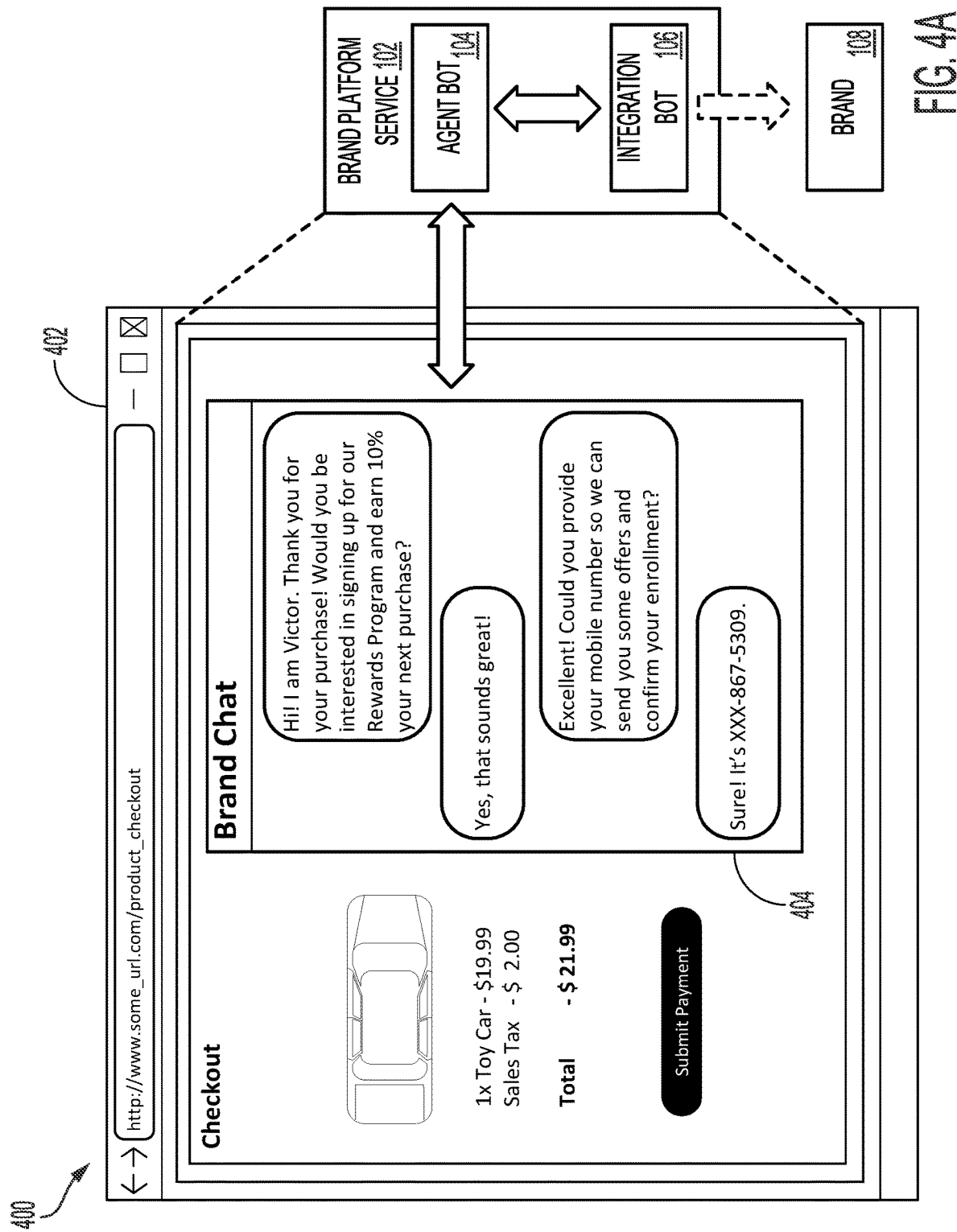
Figure 4C:
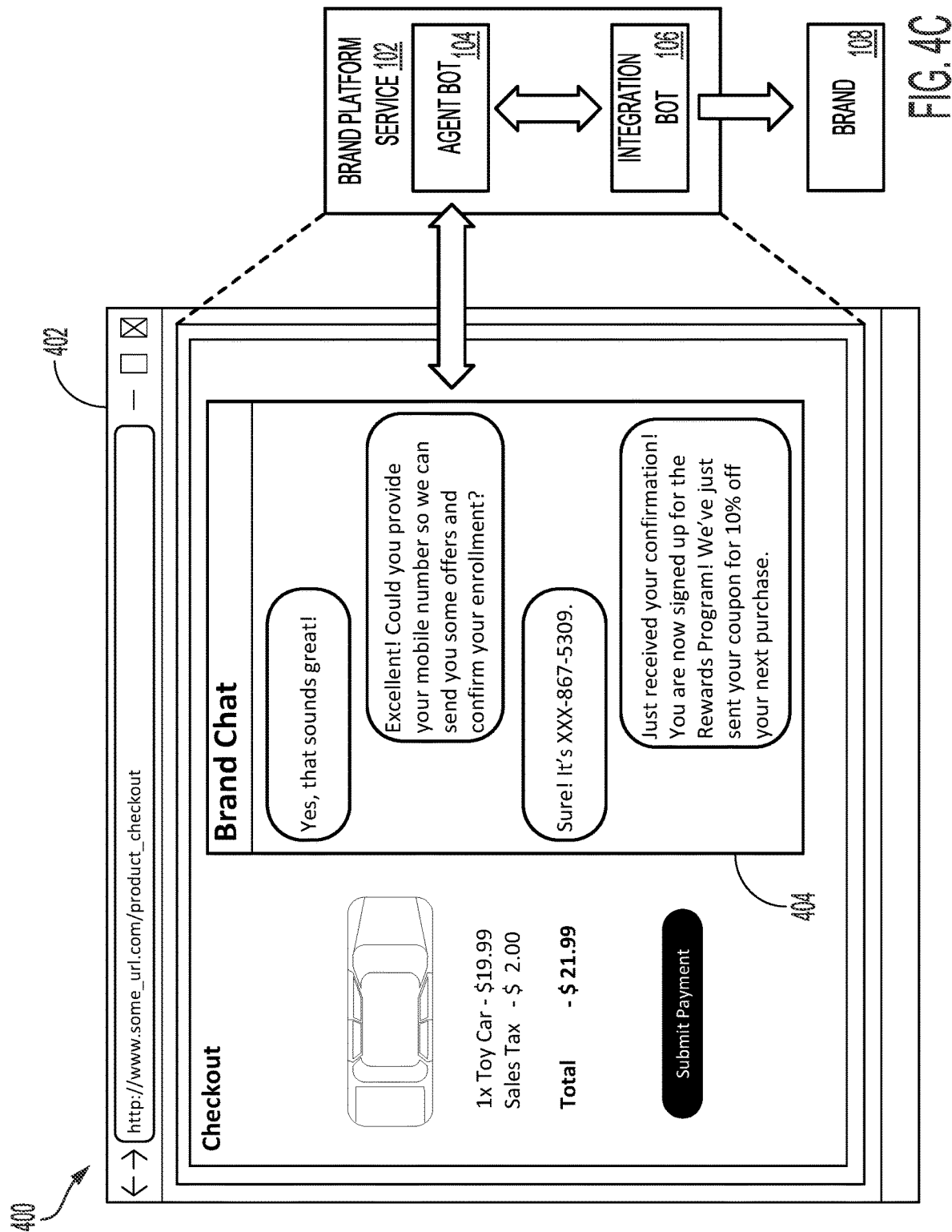

In an embodiment, if the user 112 selects a presented option to initiate a communications session 118 with an agent bot 104, the brand platform service 102 facilitates the communications session 118 between the user 112 and the agent bot 104. The communications session 118 may be facilitated through one or more communications channels. For example, as illustrated in FIG. 1, the communications session 118 may be facilitated through an online chat presented via the website or application provided by the brand platform service 102. For instance, as illustrated in FIGS. 4A and 4C, the communications session may be presented within a website corresponding to a checkout process for making a purchase associated with an item provided by the brand 108. However, the communications session 118 may be facilitated through any available communications channel, such as through Short Message Service (SMS) messaging, Multimedia Messaging Service (MMS) messaging, instant messaging platforms, social media platforms, and the like.

The agent bot 104, in an embodiment, is an automated process that is executed to communicate with users over communications sessions established between these users and the agent bot 104. The agent bot 104 may be implemented to elicit, from a user 112, responses that may be used to determine an intent or other sentiment associated with the user 112. For instance, when the communications session 118 is established between the user 112 and the agent bot 104, the agent bot 104 may obtain contextual information corresponding to the user's previous interactions with the website or application to automatically identify an initial intent associated with the user 112. For example, if the option to initiate the communications session 118 was provided to the user 112 as a result of detecting that the user 112 has been idle over a pre-defined period of time, the agent bot 104 may automatically determine that the user 112 may require assistance with regard to one or more elements presented on the website or application (e.g., additional information with regard to products presented on the website or application, technical support related to an item presented on the website or application, etc.). As another illustrative example, if the option to initiate the communications session 118 was provided to the user 112 within a checkout page associated with the brand platform service 102, the agent bot 104 may automatically determine that the user 112 may be provided with additional offers corresponding to the products or services being purchased. These additional offers may be associated with the brand 108, with another entity (e.g., another brand that sells accessories related to an item being purchased, third-party advertisers, etc.), and the like.

In an embodiment, as the user 112 and the agent bot 104 exchange messages in real-time through the communications session 118, the brand platform service 102 can automatically process these messages in real-time as these messages are exchanged to determine an intent associated with the user 112. The intent may (for example) be a topic, sentiment, complexity, and/or level of urgency. A topic can include, but is not limited to, a subject, a product, a service, a technical issue, a use question, a complaint, a refund request or a purchase request, etc. The brand platform service may train and implement a machine learning algorithm or artificial intelligence to automatically process these exchanged messages in real-time and as these messages are exchanged between the user 112 and the agent bot 104 to identify and extract an intent from these messages. The machine learning algorithm or artificial intelligence may be used to perform a semantic analysis of the exchanged messages (e.g., by identifying keywords, sentence structures, repeated words, punctuation characters and/or non-article words) to identify the intent expressed in these exchanged messages.

The machine learning algorithm or artificial intelligence utilized by the brand platform service 102 may be dynamically trained using supervised training techniques. For instance, a dataset of input messages and known intents included in the input messages can be selected for training of the machine learning algorithm or artificial intelligence. In some implementations, known intents used to train the machine learning algorithm or artificial intelligence may include characteristics of these intents. The machine learning algorithm or artificial intelligence may be evaluated to determine, based on the input sample messages supplied to the machine learning algorithm or artificial intelligence, whether the machine learning algorithm or artificial intelligence is extracting the expected intents from each of these messages. Based on this evaluation, the machine learning algorithm or artificial intelligence may be modified to increase the likelihood of the machine learning algorithm or artificial intelligence generating the desired results. The machine learning algorithm or artificial intelligence may further be dynamically trained by soliciting feedback from users, including user 112, with regard to the extracted intent obtained from submitted messages through the communications session 118. For instance, prior to using an extracted intent to determine an appropriate response to the user 112, the extracted intent may be presented to the user 112 to determine whether the extracted intent corresponds to the messages submitted by the user 112. The response from the user 112 may, thus, be utilized to train the machine learning algorithm or artificial intelligence based on the accuracy of the machine learning algorithm or artificial intelligence in identifying the intent from the exchanged messages.

In an embodiment, the brand platform service 102 determines whether the intent corresponds to an opportunity to present the user 112 with an offer to opt-in to supplemental communications with the brand 108. For example, if the intent corresponds to the purchase of one or more goods and/or services associated with the brand 108, the brand platform service 102 may determine that the user 112 may be receptive to an offer to obtain supplemental communications from the brand 108 (e.g., advertisements, other offers, promotions related to new or other goods/services offered by the brand 108, etc.). As another example, as messages are being exchanged in real-time between the user 112 and the agent bot 104, if the brand platform service 102 detects an intent that corresponds to the user's interest in learning more about the brand 108, the brand platform service 102 may determine that the user 112 may be interested in supplemental communications from the brand 108.

If the brand platform service 102 detects an intent that corresponds to an opportunity to present the user 112 with an offer to opt-in to supplemental communications with the brand 108, the brand platform service 102 may provide the intent and an instruction to communicate an offer to opt-in to supplemental communications with the brand 108 to the agent bot 104. The instruction, in some instances, may include a message or other parameters that may be used to construct a message that may be communicated to the user 112 through the communications session 118 to present the offer. For instance, the brand platform service 102 may provide an instruction to the agent bot 104 that, when executed by the agent bot 104, may cause the agent bot 104 to prompt the user 112 to determine whether they would be interested in opting into receiving communications from the brand 108. As another illustrative example, and as illustrated in FIG. 1, the instruction may cause the agent bot 104 to prompt the user 112 to determine whether they would be interested in signing up (opting in) for a rewards program associated with the brand 108. Through this rewards program, the user 112 may receive supplemental communications from the brand 108, including advertisements, promotional offers, coupons, discounts, and the like.

In an embodiment, the offer to opt-in to receive supplemental communications from a brand 108 can be communicated to the user 112 through the communications session 118 when the communications session 118 is initiated. As an illustrative example, during a checkout process initiated through the website or application provided by the brand platform service 102, the brand platform service 102 may present the user 112 with an option to initiate the communications session 118 with the agent bot 104. The option may be associated with the offer to opt-in to receive supplemental communications such that, if the user 112 selects the option, the agent bot 104 is automatically instructed to present the offer to opt-in to receive supplemental communications from the brand 108. For example, as illustrated in FIG. 1, the initial message from the agent bot 104 to the user 112 via the communications session 118 may include, in addition to an introduction, the offer to opt-in to receive supplemental communications from the brand 108.

In some instances, the offer to opt-in to receive supplemental communications from the brand 108 may be communicated with one or more incentives that may be used to entice the user 112 to accept the offer. For example, the user 112 may be offered coupons, discounts, free gifts, and the like if the user 112 accepts the offer to opt-in to receive supplemental communications from the brand 108. In an embodiment, the one or more incentives can be identified through a machine learning algorithm or artificial intelligence implemented by the brand platform service 102. For example, the brand platform service 102 may implement a clustering algorithm that may be used to identify similar users, corresponding incentives offered to these users, and user responses to opt-in offers presented with these incentives. These similar users may be identified based on one or more vectors (e.g., purchase histories, intent histories, demographic information, payment instruments used for purchases made through the brand platform service 102, etc.). In some instances, a dataset of characteristics of users associated with the brand platform service 102, incentives provided to these users, and user responses to presented opt-in offers may be analyzed using the clustering algorithm to determine what incentives may entice certain users to accept the presented opt-in offers. Example clustering algorithms may be trained using the collected dataset.

In an embodiment, clustering algorithms are trained using sample datasets of characteristics of users, incentives, and responses to opt-in offers to classify users and incentives in order to identify the incentives that may be offered to users associated with the brand platform service 102 to entice these users to accept presented opt-in offers for supplemental communications from the brand 108. Examples of such clustering algorithms may include, but are not be limited to, k-means clustering algorithms, fuzzy c-means (FCM) algorithms, expectation-maximization (EM) algorithms, hierarchical clustering algorithms, density-based spatial clustering of applications with noise (DBSCAN) algorithms, and the like.

In some instances, the agent bot 104 may automatically determine whether the user 112 has been previously authenticated by the brand platform service 102 and/or the brand 108. For example, if the user 112 has a pre-existing account maintained by the brand 108, and the user 112 has utilized a set of credentials in order to access this pre-existing account, the agent bot 104 may access the pre-existing account to obtain information associated with the user 112 that may be used to automatically tailor the communications session 118 in a manner that may improve the likelihood of the user 112 accepting the opt-in offer. For example, if the user 112 has previously communicated with the agent bot 104 or other agent (e.g., a live/human agent, another agent bot, etc.) with regard to another intent associated with the brand 108, the agent bot 104 may automatically process these previous communications between the agent bot 104 or other agent to determine how best to communicate with the user 112 over the communications session 118. For example, if the user 112 previously communicated with the agent bot 104 or other agent with regard to a particular technical issue, the agent bot 104 may use these previous communications, as well as natural language processing (NLP) or other artificial intelligence, to tailor the communications exchanged over the communications session 118 in a way that may elicit a favorable response from the user 112 (e.g., a sense of familiarity, a sense of receptiveness, etc.).

In an embodiment, when the agent bot 104 communicates an offer to the user 112 to opt-in to supplemental communications from the brand 108, the brand platform service 102 executes an integration bot 106 that is implemented to automatically detect user approval of the opt-in offer. The integration bot 106, in an embodiment, is an automated process that is executed to automatically process, in real-time, messages exchanged between the agent bot 104 and the user 112 to detect user acceptance of opt-in offers to receive supplemental communications from the brand 108. For instance, when the agent bot 104 communicates the opt-in offer to the user 112, the integration bot 106 may process, using NLP or other artificial intelligence, any user responses to the opt-in offer to determine whether the user 112 has accepted the opt-in offer. As an illustrative example, and as illustrated in FIG. 1, in response to the opt-in offer provided by the agent bot 104, the user 112 has provided a response that states "Yes, that sounds great!" This response may be processed by the integration bot 106 to determine that the user 112 has accepted the offer to opt-in to supplemental communications from the brand 108.

If the integration bot 106 detects that the user 112 has accepted the opt-in offer, the integration bot 106 may automatically, and in real-time, transmit an instruction to the agent bot 104 to prompt the user 112 for their contact information. This contact information may be used by the integration bot 106 to establish a second communications session with the user 112 through an alternative communications channel associated with the provided contact information. For example, if the user 112 provides, in response to this prompt for contact information, a phone number associated with a mobile device 116, the integration bot 106 may use the phone number obtained from the user 112 to transmit one or more SMS or MMS messages to the mobile device 116 associated with the user 112. As another example, if the user 112 provides an electronic mail address associated with the user 112, the integration bot 106 may use the electronic mail address to transmit an electronic mail message to the user 112.

In some instances, the integration bot 106 may automatically select the communications channel that is to be used for the second communications session with the user 112. For example, the integration bot 106 may implement a clustering algorithm that may be used to identify similar users, communications channels available to these users, and user responses to requests for contact information associated with these communications channels. These similar users may be identified based on one or more vectors (e.g., purchase histories, intent histories, demographic information, communications channels available, etc.). In some instances, a dataset of characteristics of users associated with the brand platform service 102, communications channels associated with these users, and user responses to presented requests for contact information associated with any of these communications channels be analyzed using the clustering algorithm to determine the type of contact information that may be requested from the user 112. Example clustering algorithms may be trained using the collected dataset.

The request to obtain the user's contact information for facilitating a second communications session between the user 112 and the integration bot 106 may be presented to the user 112 in order to request confirmation from the user 112 through this second communications session with regard to the user's acceptance of the opt-in offer. For example, while the user 112 may communicate an acceptance of the opt-in offer through the communications session 118, the user 112 may be required to provide confirmation for their acceptance through a separate communications channel. This may be required in order to better authenticate the user 112 to ensure that the user 112 has knowingly acquiesced to receiving supplemental communications from the brand 108. Further, in some instances, the user's confirmation may be required for regulatory purposes, whereby user approval of the opt-in offer may be required from two distinct communications channels prior to the brand 108 being able to transmit supplemental communications to the user 112.

As illustrated in FIG. 1, in response to the request from the agent bot 104 to obtain the user's contact information, the user 112 has provided a phone number associated with the user's mobile device 116. The integration bot 106, in real-time, may detect this message and extract the phone number associated with the user's mobile device 116. Further, the integration bot 106 may use the provided phone number to establish a second communications session with the user 112 through the mobile device 116. For example, while the communications session 118 is ongoing (e.g., as messages are being exchanged in real-time over the communications session 118), the integration bot 106 may engage the user 112 through the second communications session by transmitting one or more SMS or MMS messages to the mobile device 116. Through the second communications session, the integration bot 106 may indicate that it is associated with the agent bot 104 (e.g., use the same identifier as the agent bot 104, use the same pseudonym as the agent bot 104, etc.) in order to allow the user 112 to verify that the second communications session has been established between the user 112 and the integration bot 106. As an illustrative example, if the agent bot 104 introduced itself to the user 112 as "Victor" within the communications session 118, the integration bot 106 may also refer to itself as "Victor" when communicating with the user 112 via the second communications session. This may provide the user 112 with verification that the communications being received over the communications session 118 and the second communications session are both associated with the brand platform service 102.

Through the second communications session, the integration bot 106 may prompt the user 112 to confirm that they are approving the opt-in offer presented by the agent bot 104 via the communications session 118. The integration bot 106 may automatically process, in real-time, any messages submitted by the user 112 through the second communications session to detect user confirmation of the opt-in offer to receive supplemental communications from the brand 108. For example, if the integration bot 106 transmits, over the second communications session, a prompt for the user 112 to confirm that they are accepting the opt-in offer provided over the communications session 118, the integration bot 106 may automatically process any responses to this prompt to determine whether the user 112 has provided their confirmation. For instance, if the user 112 transmits an affirmative response to this prompt (e.g., "Yes," "Confirmed," "I approve," etc.), the integration bot 106 may process the affirmative response through NLP or other artificial intelligence to extract the affirmative response and determine that the user 112 has confirmed their acceptance of the opt-in offer. Alternatively, if the user 112 transmits a negative response to this prompt (e.g., "No," "I changed my mind," "I don't want to sign up anymore," etc.), the integration bot 106 may process the negative response through NLP or other artificial intelligence to extract the negative response and determine that the user 112 has rejected the opt-in offer.

Once the integration bot 106 has obtained a response from the user 112 through the second communications session either confirming or rejecting the acceptance of the opt-in offer, the integration bot 106 may provide the agent bot 104 with this response. For example, as illustrated in FIG. 1, the agent bot 104 may transmit a message over the communications session 118 acknowledging the user's confirmation to their acceptance of the opt-in offer provided by the agent bot 104. In an embodiment, the user's response to the opt-in offer and subsequent response to the confirmation request (if the user 112 initially accepted the opt-in offer over the communications session 118) are used to dynamically re-train the clustering algorithm implemented by the brand platform service 102 to determine what incentives may be presented to users to entice these users to accept presented opt-in offers. For example, if the user 112 has accepted a presented opt-in offer and has provided confirmation for their acceptance of the presented opt-in offer, the brand platform service 102 may re-train the clustering algorithm such that similar incentives may be provided to similarly situated users when presented with an opt-in offer to receive supplemental communications from the brand 108. Alternatively, if the user 112 either rejects the presented opt-in offer or has refused to confirm their acceptance of the presented opt-in offer, the brand platform service 102 may re-train the clustering algorithm such that alternative incentives may be provided to similarly situated users when presented with an opt-in offer to receive supplemental communications from the brand 108.

In some instances, in addition to re-training the clustering algorithm used to determine what incentives may be offered to users for accepting presented opt-in offers to receive supplemental communications from the brand 108, the brand platform service 102 may further determine whether to maintain an association between the previously identified intent for which the opt-in offer was presented to the user 112 and the opt-in offer. For example, if the brand platform service 102 determines that, for a particular intent, users are not responding favorably to opt-in offers provided by the agent bot 104, the brand platform service 102 may reduce the likelihood that opt-in offers are presented to users for similar intents. Alternatively, if the brand platform service 102 determines that, for the particular intent, users are receptive to opt-in offered provided by the agent bot 104, the brand platform service 102 may increase the likelihood that opt-in offers are presented to users for similar intents.

In an embodiment, if the user 112 accepts the opt-in offer provided by the agent bot 104 and provides confirmation with regard to their acceptance of the opt-in offer to the integration bot 106, the integration bot 106 provides the user's opt-in authorization to the brand 108. The opt-in authorization may include data corresponding to the user's acceptance of the opt-in offer provided by the agent bot 104 and to the confirmation provided by the user 112 to the integration bot 106 corresponding to the user's acceptance of the opt-in offer. Additionally, the opt-in authorization may include additional information corresponding to the user 112. This additional information may include contact information for the user 112 (e.g., phone numbers, electronic mail addresses, network addresses, user identifiers associated with other platforms, etc.).

The brand 108 may store the opt-in authorization within an opt-in datastore 110 maintained by the brand 108. Through the opt-in datastore 110, the brand 108 may obtain contact information for different users that may have opted into receiving supplemental communications from the brand 108. When the brand 108 determines that a supplemental communication (e.g., advertisement, discount, coupon, offer, etc.) is to be distributed to users that have opted into receiving supplemental communications from the brand 108, the brand 108 may query the opt-in datastore 110 to obtain the contact information associated with these users in order to transmit the supplemental communication to these users.

In an embodiment, a supplemental communication provided by the brand 108 may include an opt-out option, which the user 112 may select to opt-out from future supplemental communications from the brand 108. If the user 112 selects the opt-out option from a supplemental communicated provided by the brand 108, the brand 108 may automatically remove the user's contact information and previously obtained opt-in authorization from the opt-in datastore 110. This may prevent the brand 108 from providing future supplemental communications to the user 112. Additionally, the brand 108 may transmit a notification to the integration bot 106 indicating the user's decision to opt-out from future supplemental communications from the brand 108. In response to this notification, the integration bot 106 may update the agent bot 104 such that, if the user 112 again engages the brand platform service 102 at a later time, the agent bot 104 is less likely to present the user 112 with another offer to opt-in to supplemental communications from the brand 108.

In an embodiment, the user's decision to opt-out of future supplemental communications from the brand 108 can be used to further train the clustering algorithm used by the brand platform service 102 to determine what incentives are to be provided to similarly situated users in order to entice these similarly situated users to accept opt-in offers from the agent bot 104. For example, if the user 112 has accepted the opt-in offer based on an incentive provided by the agent bot 104 but subsequently opts out of future supplemental communications immediately after taking advantage of the provided incentive, the brand platform service 108 may determine that the user 112 is actually not interested in receiving supplemental communications from the brand 108. Accordingly, the brand platform service 108 may adjust the clustering algorithm such that, for similarly situated users and intents, the likelihood of a similar incentive being provided to these similarly situated users for these intents is decreased.

In some instances, the user 112 can provide, along with an opt-out request, feedback corresponding to the user's decision to submit the opt-out request. For example, the user 112 may indicate that they are receiving too many supplemental communications from the brand 108. As another example, the user 112 may indicate that the supplemental communications being received from the brand 108 are irrelevant to the brand 108 and/or to the user's interests. This feedback may be provided by the brand 108 to the brand platform service 102, which may use the feedback to dynamically update the agent bot 104 to determine whether to present, to similarly situated users, similar opt-in offers. For example, if users are opting out of receiving supplemental communications as a result of these users having received too many supplemental communications from the brand 108 or as a result of the supplemental communications being irrelevant to these users, the brand platform service 102 may adjust the agent bot 104 such that, for similarly situated users, the agent bot 104 is less likely to provide these users with an opt-in offer for supplemental communications from the brand 108.

It should be noted that the brand platform service 102 may implement multiple agent bots and integration bots to allow for simultaneous communications with different users. This may allow for the brand platform service 102 to dynamically, and in real-time, process messages corresponding to ongoing communications sessions amongst different users, agent bots, and integration bots as these messages are being exchanged to identify intents and to determine, based on these intents, whether to present opt-in offers to these different users. Further, the machine learning algorithms or artificial intelligence used by the brand platform service 102 to identify intents, determine whether to provide opt-in offers for supplemental communications, and to determine what incentives may be offered with these opt-in offers are dynamically trained in real-time using feedback from users (e.g., feedback provided when opting-out of receiving supplemental communications, feedback provided in response to the presentation of opt-in offers, etc.) and the ongoing communications sessions amongst the different users, agent bots, and integration bots. Thus, these machine learning algorithms or artificial intelligence are continuously updated in real-time as messages are exchanged during ongoing communications sessions amongst different users, agent bots, and integration bots and as opt-in offers are provided to these different users. This continuous and iterative process may serve to more accurately provide users with opt-in offers and corresponding incentives.

Figure 2:
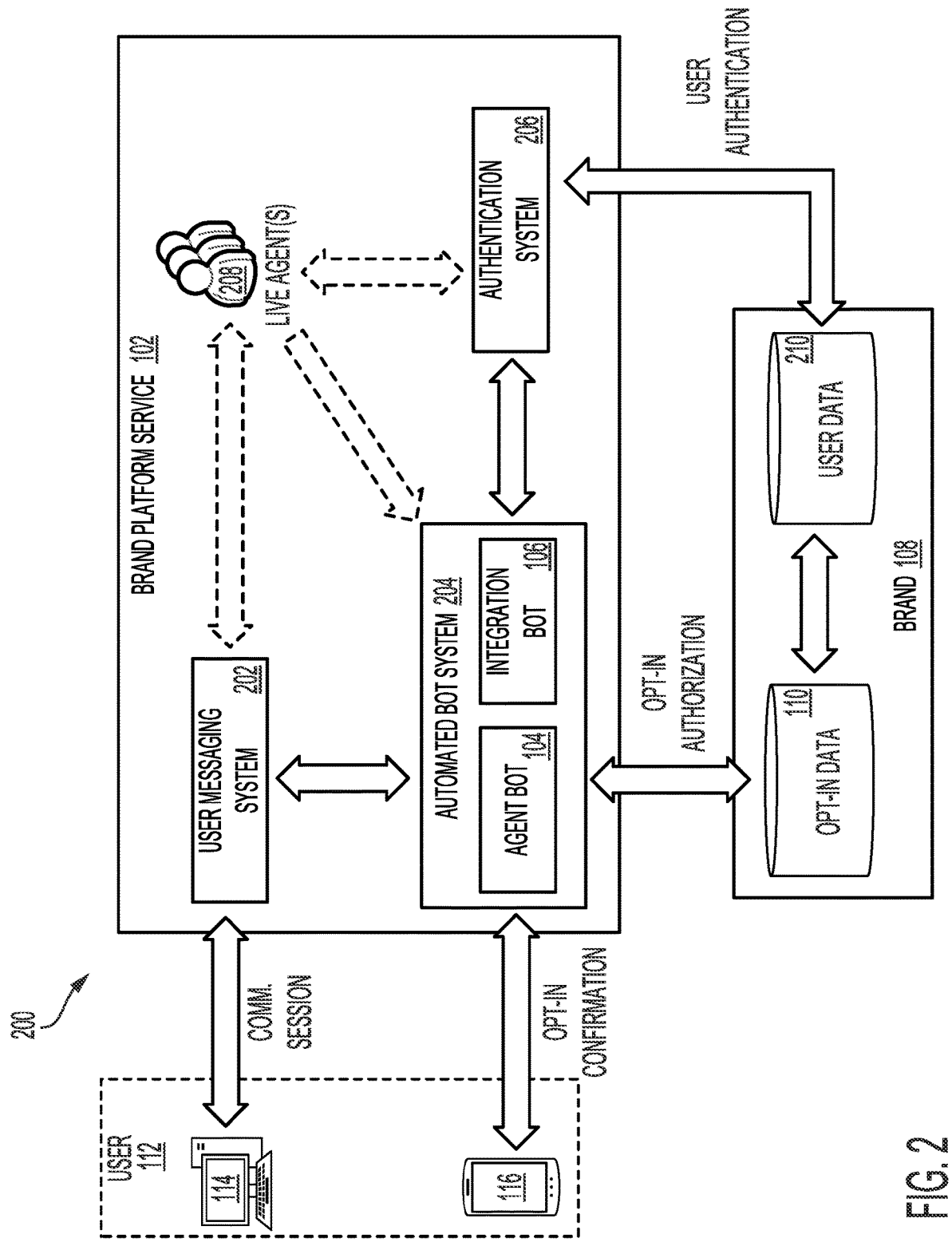
FIG. 2 shows an illustrative example of an environment in which an automated bot system implemented by a brand platform service communicates with a user to provide an opt-in offer for communications from a brand and to obtain a confirmation for acceptance of the opt-in offer in accordance with at least one embodiment.

FIG. 2 shows an illustrative example of an environment 200 in which an automated bot system 204 implemented by a brand platform service 102 communicates with a user 112 to provide an opt-in offer for supplemental communications from a brand 108 and to obtain a confirmation for acceptance of the opt-in offer in accordance with at least one embodiment. In the environment 200, the brand platform service 102 implements a user messaging system 202 that facilitates communications sessions between users associated with the brand platform service 102 and an agent. The user messaging system 202 may be implemented on a computing system of the brand platform service 102 or as an application executed by a computing system of the brand platform service 102.

As noted above, the brand platform service 102 provides, such as through a website or application implemented by the brand 108 or otherwise associated with the brand 108, an option through which a user 112 may submit (such as through computing device 114) a request to initiate a communications session with an agent (e.g., an agent bot 104, a live agent 208, etc.). For example, through a GUI provided through the website or application, the brand platform service 102 may provide the user 112 with an option to initiate a communications session with an agent. In an embodiment, the option to request facilitation of a communications session with an agent is provided by the user messaging system 202 based on contextual information garnered through monitoring of user interactions with the website or application. For example, if the user 112, through their personal computing device 114, navigates to a checkout page for the purchase of one or more items provided by the brand 108, the user messaging system 202 may automatically present the option to initiate the communications session with an agent within the checkout page. As another illustrative example, if the user 112 remains within a particular page within the website or application for a predefined period of time, the user messaging system 202 may automatically present the option to initiate the communications session with an agent.

In an embodiment, if the user 112 selects the presented option to initiate a communications session 118 with an agent, the user messaging system 202 determines, in real-time, whether to facilitate the communications session with either a live agent 208 or an agent bot 104. For instance, based on the contextual information garnered through real-time monitoring of user interactions with the website or application, the user messaging system 202 may determine whether the communications session is to be established between the user 112 and either a live agent 208 or an agent bot 104. For example, if the option is presented based on a determination that the user 112 may require assistance with regard to one or more goods offered for sale through the website or application, the user messaging system 202 may automatically facilitate a communications session between the user 112 and a live agent 208 associated with the brand platform service 102. The live agent 208 may be a human agent that may be knowledgeable with regard to one or more intents or other issues that users may wish to have resolved.

In some instances, the user messaging system 202 may automatically facilitate a communications session between the user 112 and a live agent 208 by default, regardless of the contextual information garnered through monitoring of user interactions with the website or application. As the user 112 communicates with a live agent 208 through a communications session, the live agent 208 may determine whether the communications session may be transferred to an agent bot 104 implemented by the automated bot system 204. For instance, if the live agent 208 determines that the communications session may be facilitated more efficiently using an agent bot 104, the live agent 208 may transmit a request to the automated bot system 204 to transfer the communications session to an agent bot 104.

In an embodiment, the user 112 can be authenticated using an authentication system 206 implemented by the brand platform service 102 to obtain any available data associated with the user 112 maintained by the brand 108. For example, through the communications session established between the user 112 and the live agent 208, the live agent 208 may prompt the user 112 to provide a set of credentials that may be processed by the authentication system 206 in order to authenticate the user 112. The set of credentials may include a username, a corresponding password, a cryptographic token, and the like. The authentication system 206 may be implemented on a computing system of the brand platform service 102 or as an application executed by a computing system of the brand platform service 102. In response to receiving the set of credentials associated with the user 112, the authentication system 206 may query the brand 108 to determine whether the user 112 can be authenticated. The query may include the obtained set of credentials and any other identifying information associated with the user 112 (e.g., name, address, usernames, etc.) that may be used by the brand 108 to identify and authenticate the user 112.

If the brand 108 is able to authenticate the user 112, the brand 108, through a user datastore 210, may provide additional information associated with the user 112 that may be used to dynamically tailor the communications session between the user 112 and the live agent 208. For example, the additional information may indicate any user preferences and/or idiosyncrasies that may be used by the live agent 208 to tailor messages and responses for the user 112. For example, if the user 112 has a preference for short messages (e.g., the user 112 has shown a negative polarity or sentiment with regard to long messages from agents, etc.), the live agent 208 may use this preference to ensure that messages provided to the user 112 are short. As another example, if the user 112 is known to be heavily data-oriented with regard to any goods or services that the user 112 is interested in, the live agent 208 may tailor their messages such that the live agent 208 provides as much data as possible with regard to any goods and/or services the user 112 is purchasing or otherwise requisitioning through the website or application provided by the brand platform service 102.

As noted above, the user messaging system 202 may also facilitate communications sessions between users and agent bots implemented by an automated bot system 204. The automated bot system 204 may be implemented by the brand platform service 102 to provide different bots that are configured to communicate with users with regard to different intents or other issues. These bots can be configured to autonomously communicate with users through their computing devices. Further, each bot can be configured for a specific capability. Examples of capabilities can include updating database records, providing updates to users, providing additional data about the user 112 to agents (e.g., live agents 208), determining a user's intent and routing the user 112 to a destination system (e.g., an agent bot 104, a terminal associated with a live agent 208, etc.) based on the intent, predicting or suggesting responses to agents communicating with users, escalating communication sessions to include one or more additional bots or agents, and other suitable capabilities. In some instances, while an agent bot 104 is communicating with a user 112 during a communication session, the user messaging system 202 can automatically and dynamically determine to switch the agent bot 104 with a live agent 208. For example, agent bots can communicate with users about certain intents, whereas live agents 208 can communicate with users about more difficult intents.

In an embodiment, the user messaging system 202 automatically, and in real-time, processes messages exchanged between the user 112 and the agent bot 104 or live agent 208 as these messages are exchanged to identify an intent corresponding to these messages. As noted above, the brand platform service 102 may dynamically train a machine learning algorithm or artificial intelligence to automatically process messages between a user 112 and an agent bot 104 or live agent 208 in real-time and as these messages are exchanged to identify and extract an intent associated with these messages. The machine learning algorithm or artificial intelligence may be used to perform a semantic analysis of the exchanged messages to identify the intent expressed in these exchanged messages.

In addition to identifying and extracting an intent from exchanged messages, the machine learning algorithm or artificial intelligence, in an embodiment, is further dynamically trained (in real-time or near real-time) to determine, based on the identified intent and the exchanged messages, whether an opt-in offer for supplemental communications from the brand 108 may be presented to the user 112. For instance, a dataset of intents (e.g., historical intents associated with prior actual communications sessions, hypothetical or artificial intents associated with simulated communications sessions, etc.), opt-in offers, and feedback (e.g., historical feedback provided based on actual opt-in offers provided, hypothetical or artificial feedback corresponding to simulated communications sessions and opt-in offers, etc.) related to these opt-in offers (e.g., acceptance or rejection of opt-in offers) can be selected for training of the machine learning algorithm or artificial intelligence. The machine learning algorithm or artificial intelligence may be evaluated to determine, based on the sample intents, whether the machine learning algorithm or artificial intelligence is accurately recommending presentation of opt-in offers for receiving supplemental communications from the brand 108. Based on this evaluation, the machine learning algorithm or artificial intelligence may be modified to increase the likelihood of the machine learning algorithm or artificial intelligence generating the desired results. The machine learning algorithm or artificial intelligence may further be dynamically trained by soliciting feedback from users, including user 112, with regard to the presentation of the opt-in offer through the communications session. For instance, if a user rejects an opt-in offer for supplemental communications from the brand 108, the user messaging system 202 may use this feedback to re-train the machine learning algorithm or artificial intelligence such that, for similarly situated users and corresponding intents, the likelihood of an opt-in offer being recommended is decreased. Alternatively, if the user accepts an opt-in offer for supplemental communications from the brand 108, the user messaging system 202 may use this feedback to reinforce the machine learning algorithm or artificial intelligence such that, for similarly situated users and corresponding intents, the likelihood of an opt-in offer being recommended is maintained or increased.

In an embodiment, the machine learning algorithm or artificial intelligence is dynamically and continuously updated in real-time as messages are exchanged amongst different users and agents during different communications sessions, as opt-in offers are provided during these different communications sessions, and as feedback corresponding to these opt-in offers is received for these different communications sessions. Thus, based on the feedback received with regard to presented opt-in offers, the machine learning algorithm or artificial intelligence may be continuously, and dynamically updated in real-time to continuously improve or reinforce the accuracy of the machine learning algorithm or artificial intelligence in determining whether to recommend presentation of opt-in offers for different ongoing communications sessions.

It should be noted that, in some instances, the determination as to whether an opt-in offer may be communicated to a user 112 may be made without the use of a machine learning algorithm or artificial intelligence. For instance, the user messaging system 202 may maintain associations between different intents and opt-in offer determinations such that, for a particular intent, the user messaging system 202 may review these associations to determine whether an opt-in offer may be communicated to the user 112 via the communications session.

If the user messaging system 202 determines, based on the exchanged messages and the intent associated with these exchanged messages, that an opt-in offer for supplemental communications from the brand 108 may be communicated to the user 112, the user messaging system 202 may provide a recommendation for presentation of the opt-in offer. For example, if the communications session is facilitated by the user messaging system 202 between the user 112 and a live agent 208, the user messaging system 202 may transmit a notification to the live agent 208 to indicate that they should present an opt-in offer to the user 112 over the communications session. In an embodiment, rather than transmitting a notification to the live agent 208, the user messaging system 202 can automatically transfer the communications session from the live agent 208 to an agent bot 104 that may automatically communicate the opt-in offer to the user 112. In another embodiment, rather than transmitting a notification to the live agent 208, the user messaging system 202 can automatically add the agent bot 104 to the communications session such that the agent bot 104 may automatically communicate the opt-in offer to the user 112 while allowing the live agent 208 to continue their communications with the user 112 over the communications session. In some instances, rather that transmitting a notification to the live agent 208, the user messaging system 202 may automatically communicate the opt-in offer to the user 112 through the communications session without intervention from the live agent 208 or an agent bot 104.

In an embodiment, the user messaging system 202 further determines whether to provide the user 112 with one or more incentives to accept the opt-in offer for supplemental communications from the brand 108. These one or more incentives may include coupons, discounts, free gifts, and the like that may be appealing to the user 112 and, thus, may entice the user 112 to accept the opt-in offer. As noted above, these incentives may be identified using a machine learning algorithm or artificial intelligence implemented by the user messaging system 202 and dynamically trained using a dataset of similar users, corresponding incentives offered to these similar users, and the decisions made by similar users regarding opt-in offers provided to these similar users. In some instances, if the user 112 was successfully authenticated by the user authentication system 206 through the user datastore 210 implemented by the brand 108, the user messaging system 202 may utilize user information from the user datastore 210 as input to the machine learning algorithm or artificial intelligence to identify the incentives that may be offered to the user 112. Alternatively, if the user 112 cannot be authenticated by the authentication system 206 (e.g., the user 112 does not have a pre-existing relationship with the brand 108 or the brand platform service 102), the user messaging system 202 may use any information garnered through the messages exchanged between the user 112 and the agent bot 104 and/or live agent 208 as input to the machine learning algorithm or artificial intelligence to identify the incentives that may be offered to the user 112.

As noted above, if an opt-in offer to receive supplemental communications from the brand 108 is communicated to the user 112 over the communications session between the user 112 and the live agent 208 and/or agent bot 104, the automated bot system 204 may execute an integration bot 106 that is implemented to automatically detect user approval or rejection of the opt-in offer. For instance, in addition to providing a recommendation for presentation of the opt-in offer, the user messaging system 202 may transmit a request to the automated bot system 204 to execute the integration bot 106. Alternatively, the live agent 208 and/or agent bot 104 may interact with the automated bot system 204 to execute the integration bot 106 upon communicating the opt-in offer to the user 112. Upon execution, the integration bot 106 may automatically process, in real-time and as messages are exchanged between the user 112 and the live agent 208 and/or agent bot 104, to detect either user acceptance or rejection of the communicated opt-in offer.

If the integration bot 106 detects that the user 112 has rejected the opt-in offer (e.g., the user 112 transmits a message explicitly rejecting the opt-in offer, the opt-in offer is automatically rejected after a time-out period has elapsed, etc.), the integration bot 106 may provide, to the user messaging system 202, an indication of the user's rejection of the opt-in offer. The user messaging system 202, in response to this indication from the integration bot 106, may re-train the machine learning algorithm or artificial intelligence implemented to determine whether to recommend presentation of opt-in offers to users associated with the brand platform service 102. As noted above, if a user rejects an opt-in offer for supplemental communications from the brand 108, the user messaging system 202 may use this feedback to re-train the machine learning algorithm or artificial intelligence such that, for similarly situated users and corresponding intents, the likelihood of an opt-in offer being recommended is decreased. Once the indication has been provided to the user messaging system 202 and the machine learning algorithm or artificial intelligence has been retrained accordingly, the integration bot 106 may be terminated.

If the integration bot 106 detects that the user 112 has accepted the opt-in offer (e.g., the user 112 transmits a message explicitly accepting the opt-in offer), the integration bot 106 may automatically, and in real-time, transmit an instruction to the agent bot 104 or to the live agent 208 (depending on whether the agent bot 104 or the live agent 208 are engaged in the communications session) to prompt the user 112 for their contact information. As noted above, the contact information may be used by the integration bot 106 to establish a second communications session with the user 112 (such as through the user's mobile device 116) to confirm that the user 112 accepts the opt-in offer for supplemental communications from the brand 108. In some instances, the integration bot 106 may automatically select the communications channel that is to be used for the second communications session. For example, if the user 112 has been authenticated via the authentication system 206 and the user datastore 210 maintained by the brand 108, the integration bot 106 may identify, from the user datastore 210, communications channels that the user 112 is known to utilize (e.g., SMS messaging, MMS messaging, electronic mail, instant messaging platforms, social media platforms, etc.). Based on this information, the integration bot 106 may select a particular communications channel for the second communications session and instruct the agent bot 104 or the live agent 208 to prompt the user 112 for contact information corresponding to the selected communications channel (e.g., phone number, electronic mail address, network address, username or handle, etc.). In some instances, the integration bot 106 may automatically prompt the user 112 for their contact information through the communications session without requiring any additional action from the agent bot 104 or the live agent 208.

As noted above, in some instances, the integration bot 106 may implement a clustering algorithm that is used to identify similar users, communications channels available to these users, and user responses to requests for contact information associated with these communications channels. Using the clustering algorithm, the integration bot 106 may automatically identify a communications channel that may be used to establish the second communications session with the user 112. The integration bot 106 may transmit instructions to the agent bot 104 or the live agent 208 to prompt the user 112 for contact information corresponding to the identified communications channel.

If the user 112 provides their contact information to the agent bot 104 or the live agent 208 through the communications session, the integration bot 106 may use the provided contact information to establish the second communications session with the user 112. This second communications session may be facilitated in real-time while the original communications session between the user 112 and the agent bot 104 and/or live agent 208 is ongoing. As noted above, through this second communications session, the integration bot 106 may indicate that it is associated with the agent bot 104 or the live agent 208 (e.g., use the same identifier as the agent bot 104, use the same pseudonym as the agent bot 104, indicate that it is communicating on behalf of the live agent 208, etc.) in order to allow the user 112 to verify that the second communications session has been established between the user 112 and the integration bot 106 and pertains to the opt-in offer.

The integration bot 106, through this second communications session, may prompt the user 112 to confirm that they accept the opt-in offer for supplemental communications from the brand 108. In response to this prompt, the user 112 may either confirm or reject their prior approval of the opt-in offer. Once the integration bot 106 has obtained a response from the user 112 through the second communications session either confirming or rejecting their prior approval of the opt-in offer, the integration bot 106 may provide the agent bot 104 and/or the live agent 208 with this response. Additionally, the user's response to the confirmation request may be used to dynamically re-train the clustering algorithm previously used to determine what incentives may be presented to users to entice these users to accept presented opt-in offers, as described above. Further, the user's response to the confirmation request may be used to determine whether to maintain an existing association between the previously identified intent and the opt-in offer. In an embodiment, the user's response to the confirmation request can be used by the integration bot 106 to dynamically re-train or reinforce the machine learning algorithm or artificial intelligence that is dynamically trained to determine whether to present users with opt-in offers during their ongoing communications sessions with different agent bots and/or live agents.

It should be noted that the machine learning algorithm/artificial intelligence used to determine whether to present opt-in offers to users and the clustering algorithm used to determine what incentives may be provided with these opt-in offers are both dynamically updated, in real-time or near real-time, as messages are exchanged during ongoing communications sessions between different users and agent bots/live agents and during ongoing supplemental communications sessions between different users and the integration bot 106. For instance, as different users provide responses (e.g., acceptance or rejection) to provided opt-in offers through their communications sessions with different live agents/agent bots, the integration bot 106 may continuously and dynamically update the machine learning algorithm/artificial intelligence and the clustering algorithm in real-time to improve or reinforce the accuracy of these algorithms in generating opt-in offer recommendations and corresponding incentives (if any) for accepting these opt-in offers. Further, as different users provide responses (e.g., acceptance or rejection) to confirmation requests submitted through corresponding supplemental communications sessions with the integration bot 106, the integration bot 106 may continuously and dynamically update the machine learning algorithm/artificial intelligence and the clustering algorithm in real-time.

As noted above, if the user 112 both accepts the opt-in offer and provides their confirmation regarding this acceptance of the opt-in offer, the integration bot 106 may provide the user's opt-in authorization to the brand 108. The brand 108 may store the opt-in authorization within the opt-in datastore 110 maintained by the brand 108. Through the opt-in datastore 110, the brand 108 may obtain contact information for different users that may have opted into receiving supplemental communications from the brand 108. When the brand 108 determines that a supplemental communication is to be distributed to users that have opted into receiving supplemental communications from the brand 108, the brand 108 may query the opt-in datastore 110 to obtain the contact information associated with these users in order to transmit the supplemental communication to these users.

Figure 3:
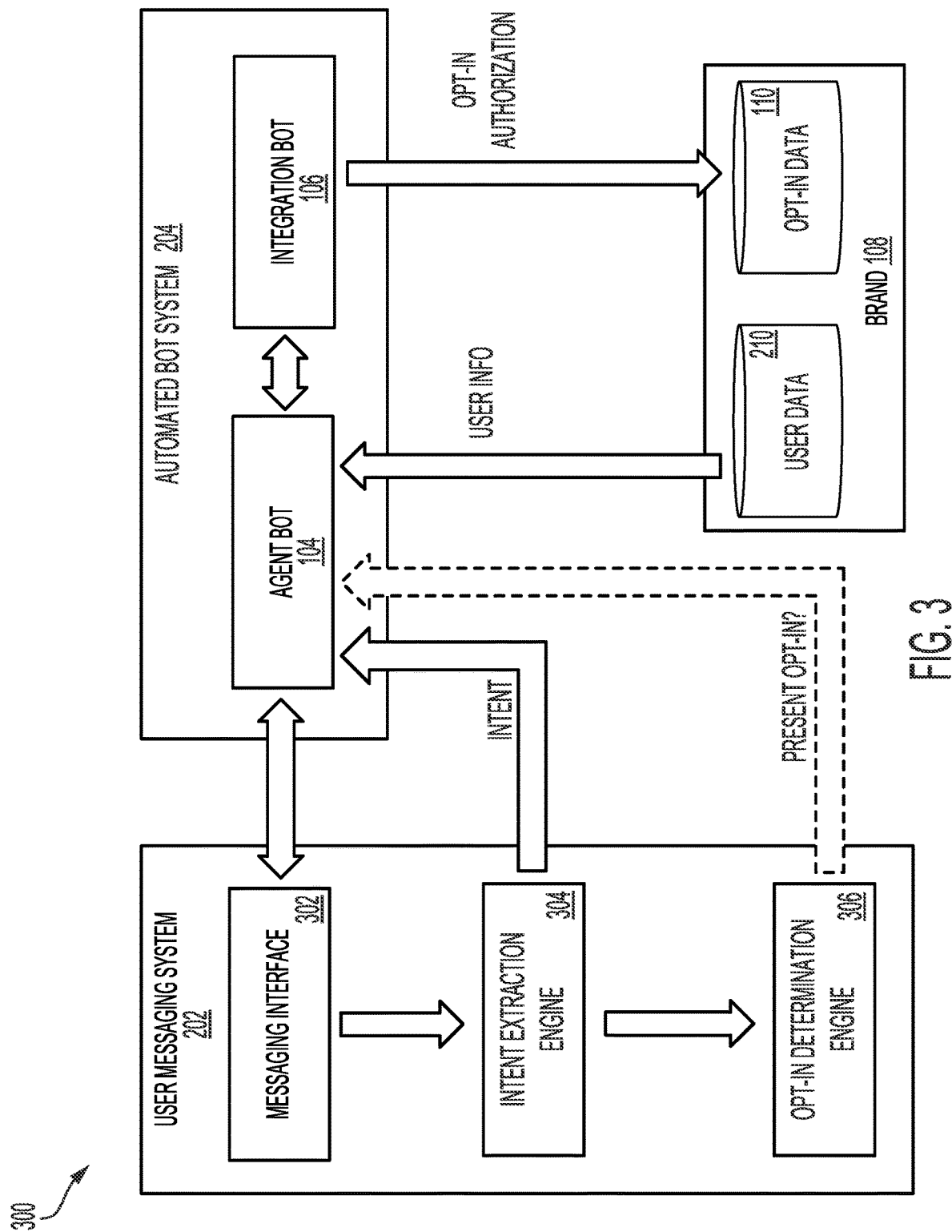
FIG. 3 shows an illustrative example of an environment in which a user messaging system automatically and in real-time processes messages exchanged over a communications session between an agent bot and a user to determine whether to present an opt-in offer in accordance with at least one embodiment.

FIG. 3 shows an illustrative example of an environment 300 in which a user messaging system 202 automatically and in real-time processes messages exchanged over a communications session between an agent bot 104 and a user to determine whether to present an opt-in offer in accordance with at least one embodiment. As noted above, the user messaging system 202 facilitates communications sessions between users and agent bots implemented by the brand platform service through the automated bot system 204. In the environment 300, to facilitate a communications session between a user and a particular agent bot 104, the user messaging system 202 may implement a messaging interface 302 through which the user and the particular agent bot 104 may exchange messages in real-time. The messaging interface 302 may be implemented as a GUI that is presented via a website or application implemented by the brand platform service. For example, through a website or application implemented by the brand platform service, a user may select an option to initiate a communications session with an agent bot 104. The user messaging system 202 may, in real-time, detect selection of the presented option and, in response, initiate the messaging interface 302 through the website or application.

In an embodiment, the agent bot 104 can obtain information from the user that can be used to authenticate the user. For instance, through the messaging interface 302, the agent bot 104 may automatically prompt the user to provide a set of credentials or other information that may be used to authenticate the user. The set of credentials or other information may include a username, a password, a one-time password (OTP), biometric information associated with the user, a cryptographic token, contact information associated with the user (e.g., electronic mail address, physical address information, phone number, etc.), and the like. As noted above, the agent bot 104 may provide this set of credentials or other information to an authentication system implemented by the brand platform service which, in turn, may query the brand 108 to determine whether the user 112 can be authenticated. If the user is successfully authenticated by the brand 108, the agent bot 104 may obtain, from the user datastore 210 maintained by the brand 108, any additional information associated with the user that may be used to dynamically tailor the communications session between the user and the agent bot 204 through the messaging interface 302.

As illustrated in FIG. 3, the user messaging system 202 may implement an intent extraction engine 304 that is configured to automatically process messages between the user and the agent bot 104 in real-time and as these messages are exchanged to identify an intent associated with these messages. As noted above, an intent may (for example) be a topic, sentiment, complexity, and/or level of urgency. A topic can include, but is not limited to, a subject, a product, a service, a technical issue, a use question, a complaint, a refund request or a purchase request, and the like. In an embodiment, the intent extraction engine 304 implements a machine learning algorithm or artificial intelligence that is dynamically trained in real-time to identify intents associated with messages exchanged between a user and an agent bot 104 as these messages are exchanged in real-time through the messaging interface 302. For instance, the machine learning algorithm or artificial intelligence may be dynamically trained to perform a semantic analysis of the exchanged messages to identify the intent expressed in these exchanged messages. Further, the machine learning algorithm or artificial intelligence may be dynamically trained using a dataset of input messages (e.g., historical messages exchanged between users and agent bots, hypothetical or artificial messages, etc.) and known intents included in the input messages. The machine learning algorithm or artificial intelligence may be evaluated to determine, based on the input sample messages supplied to the machine learning algorithm or artificial intelligence, whether the machine learning algorithm or artificial intelligence is extracting the expected intents from each of these messages. Based on this evaluation, the machine learning algorithm or artificial intelligence may be dynamically retrained to increase the likelihood of the machine learning algorithm or artificial intelligence accurately identifying the corresponding intent. The machine learning algorithm or artificial intelligence may further be dynamically trained by soliciting feedback from users with regard to the extracted intent obtained from submitted messages. The extracted intent may be presented to the user to determine whether the extracted intent corresponds to the messages submitted by the user. The response from the user may, thus, be utilized to train the machine learning algorithm or artificial intelligence to better identify the intent from the exchanged The intent extraction engine 304 may provide the identified intent to the agent bot 104, which may use the intent in order to determine how best to respond to the user through the messaging interface 302. For example, if the intent corresponds to a technical support issue that the user wishes to have resolved, the agent bot 104 may automatically identify appropriate responses to the technical support issue that may be provided to the user. This may include supplying the user with detailed instructions on how to resolve the technical issue, links to documents or videos demonstrating how to resolve the technical issue, escalating the communications session to another bot or live agent that is specialized to resolve the technical issue, and the like. As another illustrative example, if the intent corresponds to a query for information regarding a particular product, the agent bot 104 may automatically access a product datastore maintained by the brand 108 or by the brand platform service on behalf of the brand 108 to obtain the required information. This information may then be presented to the user through the messaging interface 302.

In an embodiment, in addition to providing the identified intent to the agent bot 104 to allow for the agent bot 104 to tailor the communications with the user according to the intent, the intent extraction engine 304 further provides the intent to an opt-in determination engine 306 implemented by the user messaging system 202. The opt-in determination engine 306 may maintain associations between different intents and opt-in offer determinations such that, for a particular intent, the opt-in determination engine 306 may review these associations to determine whether the identified intent corresponds to a determination that an opt-in offer may be communicated to the user by the agent bot 104 via the messaging interface 302. If the opt-in determination engine 306 determines that there is an existing association between the identified intent and an opt-in offer that may be presented to the user, the opt-in determination engine 306 may automatically transmit an instruction to the agent bot 104 to present the opt-in offer to the user via the messaging interface 302.

In some instances, the opt-in determination engine 306 may determine whether the opt-in offer may be presented with one or more incentives that may be used to entice the user to accept the opt-in offer. For instance, for a particular intent, an opt-in offer may be associated with one or more particular incentives. As an illustrative example, if the identified intent corresponds to a user purchase of one or more items associated with the brand 108, the opt-in offer may be provided with an incentive that includes one or more coupons or discounts towards a future purchase from the brand 108 if the user accepts the opt-in offer. As another illustrative example, if the identified intent corresponds to a request to enroll in a rewards program associated with the brand 108, the opt-in offer may be provided with an incentive for bonus rewards program points for a limited time if the user accepts the opt-in offer. Thus, the provided incentive may be tailored according to the identified intent.

In an embodiment, the opt-in determination engine 306 implements a machine learning algorithm or artificial intelligence that is dynamically trained to determine, based on the identified intent, whether to present the user with an opt-in offer. The machine learning algorithm or artificial intelligence may be trained using a selected dataset of intents, opt-in offers, and feedback related to these opt-in offers (e.g., acceptance or rejection of opt-in offers). The machine learning algorithm or artificial intelligence may be evaluated to determine, based on the sample intents, whether the machine learning algorithm or artificial intelligence is correctly recommending presentation of opt-in offers to users. The machine learning algorithm or artificial intelligence may further be dynamically trained by soliciting feedback from users with regard to the presentation of the opt-in offer through the messaging interface 302.

The opt-in determination engine 306 may further implement a machine learning algorithm or artificial intelligence to dynamically determine what incentives may be provided to the user with the opt-in offer. The machine learning algorithm or artificial intelligence may be dynamically trained, in real-time, based on similar users, corresponding incentives offered to these similar users, and the decisions made by similar users regarding opt-in offers provided to these similar users. The opt-in determination engine 306 may obtain, from the user datastore 210 or from the agent bot 104, user information associated with the particular user as input to the machine learning algorithm or artificial intelligence to identify a corresponding cluster of similarly situated users to identify the incentives that may be offered to the particular user.

In an embodiment, if the agent bot 104 presents, through the messaging interface 302, an opt-in offer for supplemental communications from the brand 108, the automated bot system 204 automatically executes an integration bot 106. The integration bot 106 is implemented to dynamically process, in real-time, communications exchanged between the user and the agent bot 104 over the messaging interface 302 as these communications occur to determine whether the user has accepted or rejected an opt-in offer presented to the user. For instance, if the user rejects the presented opt-in offer, the integration bot 106 may provide, to the opt-in determination engine 306, an indication of the user's rejection of the opt-in offer. This indication may be used by the opt-in determination engine 306 to determine whether to dynamically adjust the association between the identified intent associated with the present communications session and the presented opt-in offer. For example, if users associated with a particular intent are consistently rejecting a presented opt-in offer, the opt-in determination engine 306 may adjust the association between the intent and the opt-in offer such that the opt-in offer is no longer presented for the particular intent. As another illustrative example, rather than terminating the association between the particular intent and the opt-in offer, the opt-in determination engine 306 may change the incentives provided with the opt-in offer in order to better entice users to accept the opt-in offer.

If the opt-in determination engine 306 implements a machine learning algorithm or artificial intelligence (as described above) to determine whether to present an opt-in offer for the identified intent, in response to this indication from the integration bot 106, the opt-in determination engine 306 may re-train the machine learning algorithm or artificial intelligence. For instance, if the user rejects an opt-in offer for supplemental communications from the brand 108, the opt-in determination engine 306 may use this feedback to re-train the machine learning algorithm or artificial intelligence such that, for similarly situated users and corresponding intents, the likelihood of an opt-in offer being recommended is decreased. Once the indication has been provided to the opt-in determination engine 306 and the machine learning algorithm or artificial intelligence has been retrained accordingly, the integration bot 106 may be automatically terminated.

If the user accepts the presented opt-in offer, the integration bot 106 may automatically and in real-time transmit an instruction to the agent bot 104 to prompt the user over the messaging interface 302 for their contact information. This contact information may be used by the integration bot 106 to establish an alternative communications session through which the integration bot 106 may communicate with the user in order to confirm the user's acceptance of the opt-in offer. As noted above, the integration bot 106 may automatically select the communications channel that is to be used for the alternative communications session. For example, if the user has been authenticated by the brand 108, the integration bot 106 may identify, from the user datastore 210, communications channels that the user is known to utilize. Based on this information from the user datastore 210, the integration bot 106 may select a particular communications channel for the alternative communications session. Further, based on the selected communications channel, the integration bot 106 may determine the form of contact information that may be required from the user in order to establish the alternative communications session over the selected communications channel.

The integration bot 106 may continue to automatically process the exchanged messages between the user and the agent bot 104 in real-time and as these messages are exchanged to determine whether the user has supplied the requested contact information. If the integration bot 106 obtains the requested contact information from the user through the messaging interface 302, the integration bot 106 may use the obtained contact information to establish the alternative communications session over the selected communications channel. For example, if the selected communications channel corresponds to SMS messaging, the integration bot 106 may use a phone number provided by the user over the messaging interface 302 to transmit an SMS message to the user, thereby establishing the alternative communications session through SMS messaging. As another illustrative example, if the user has provided an electronic mail address, the integration bot 106 may transmit an electronic mail message to the user through the indicated electronic mail address to establish the alternative communications session.

Through the alternative communications session, the integration bot 106 may indicate that it is associated with the agent bot 104 (e.g., use the same identifier as the agent bot 104, use the same pseudonym as the agent bot 104, indicate that it is communicating on behalf of the agent bot 104, etc.) in order to allow the user to verify that the second communications session has been established between the user and the integration bot 106 and pertains to the opt-in offer presented over the messaging interface 302. Further, through the alternative communications session, the integration bot 106 may prompt the user to confirm that they accept the opt-in offer for supplemental communications from the brand 108.

In an embodiment, if the user refuses to confirm that they accept the opt-in offer (e.g., the user explicitly indicates to the integration bot 106 that they do not wish to provide confirmation, a pre-defined period of time has elapsed without a confirmation, etc.), the integration bot 106 may transmit a notification to the agent bot 104 to indicate that the user has not provided confirmation for acceptance of the opt-in offer. This may cause the agent bot 104 to transmit a message to the user, over the messaging interface 302, to indicate that the user has not confirmed their acceptance of the previously presented opt-in offer. As a result, the user may not be enrolled to receive supplemental communications from the brand 108. Further, once the notification has been provided to the agent bot 104, the integration bot 106 may be automatically terminated.

In an embodiment, if the user provides confirmation of their acceptance of the opt-in offer (e.g., the user explicitly indicates that they can confirm that they accepted the opt-in offer), the integration bot 106 can provide the user's opt-in authorization to the brand 108. As noted above, the brand 108 may store the user's opt-in authorization within the opt-in datastore 110. The opt-in authorization provided by the integration bot 106 may include contact information associated with the user and that may be used by the brand 108 to transmit supplemental communications to the user. Thus, when the brand 108 is to send supplemental communications to users that have opted to receive these supplemental communications, the brand 108 may automatically query the opt-in datastore 110 to retrieve the contact information associated with these users and use the retrieved contact information to provide the supplemental communications to these users.

Regardless of whether the user has confirmed their acceptance of the opt-in offer or has rejected the opt-in offer through the alternative communications session with the integration bot 106, the integration bot 106 may use the user's response to the request for confirmation of their acceptance of the opt-in offer to dynamically retrain the machine learning algorithm or artificial intelligence implemented by the opt-in determination engine 306 to determine whether to present an opt-in offer for a particular intent and to identify what incentives may be provided with an opt-in offer to entice users to accept the opt-in offer. For example, if the user refuses to provide their confirmation for a previous acceptance of the opt-in offer, the integration bot 106 may record this interaction as an indication that the user has rejected the opt-in offer. Accordingly, the integration bot 106 may provide this response to the opt-in determination engine 306, which may determine whether to dynamically adjust the association between the identified intent associated with the present communications session and the presented opt-in offer. For example, the opt-in determination engine 306 may adjust the association between the intent associated with the present communications session and the opt-in offer such that the opt-in offer is no longer presented for the particular intent. As another illustrative example, the opt-in determination engine 306 may change the incentives provided with the opt-in offer in order to better entice users to accept the opt-in offer and to provide confirmation for their acceptance of the opt-in offer.

If the user accepts the presented opt-in offer and provide their confirmation for the acceptance of the opt-in offer to the integration bot 106, the integration bot 106 may provide this response to the opt-in determination engine 306, which may reinforce the machine learning algorithm or artificial intelligence implemented by the opt-in determination engine 306 to determine whether to present an opt-in offer for a particular intent and to identify what incentives may be provided with an opt-in offer to entice users to accept the opt-in offer. For example, if the user confirms their acceptance of the opt-in offer, the integration bot 106 may provide the confirmation to the opt-in determination engine 306, which may reinforce the association between the identified intent and the opt-in offer presented to the user such that the likelihood of the opt-in offer being presented to similar users for similar intents is increased. Further, the opt-in determination engine 306 may reinforce the machine learning algorithm or artificial intelligence such that, for similar users and intents, the previously provided incentives may be provided with the opt-in offer presented to these similar users for similar intents.

FIGS. 4A-4C show an illustrative example of an environment 400 in which a user, through different communications channels, is provided with an opt-in offer and with a request to confirm acceptance of the opt-in offer in order to allow a brand 108 to provide supplemental communications to the user in accordance with at least one embodiment. As illustrated in FIG. 4A, in the environment 400, a user may be engaged with a brand platform service 102 through a website provided by the brand platform service 102. The website may be accessed by the user through a browser application 402 implemented on a user's personal computing device. Through the website, the user may be engaged in a checkout process, through which the user may be in the process of submitting payment for one or more goods and/or services provided by the brand 108.

As noted above, the brand platform service 102 may provide, through the website, an option through which a user may submit a request to initiate a communications session 404 with an agent bot 104 implemented by the brand platform service 102. The option may be presented in the form of an interactable element within the web site, such as an interface button, a chat window, or another element through which the user may request initiation of a communications session with an agent bot 104. In some instances, the option may be provided with one or more incentives that may be used to entice the user to engage in a communications session with the agent bot 104. For example, if the user is engaged in a checkout process (as illustrated in FIG. 4A), the brand platform service 102 may present the option with a possible discount towards a future purchase (e.g., "Want a 10% Discount Off Your Next Purchase? Click Here!") or other benefits (e.g., "Earn Double Your Rewards Points. Find Out More!").

In an embodiment, the option is provided by the brand platform service 102 based on contextual information garnered through monitoring of user interactions with the website. For example, if the user, through the browser application 402, navigates to a checkout page for the purchase of one or more items provided by the brand 108, the brand platform service 102 may automatically present the option to initiate the communications session with an agent bot 104 within the checkout page. As another illustrative example, if the user remains within a particular page within the website for a pre-defined period of time, the brand platform service 102 may automatically present the option to initiate the communications session with an agent bot 104.

If the user selects the presented option, the brand platform service 102 may initiate a communications session 404 between the user and the agent bot 104. The communications session 404 may be implemented as a standalone chat session within the website. This may allow the user to engage the agent bot 104 while still being able to engage the other elements of the web site (e.g., completing the illustrated checkout process, etc.). In some instances, the agent bot 104 may evaluate the contextual information garnered through monitoring of user interactions with the website to determine how best to approach the user through the communications session 404. For example, if the option to initiate the communications session 404 was provided to the user within a checkout page associated with the brand platform service 102, the agent bot 104 may automatically determine that the user may be provided with additional offers corresponding to the products or services being purchased, with an option to sign up for a rewards program associated with the brand 108, and the like.

In some instances, the contextual information garnered through monitoring of user interactions with the website may be used to dynamically, and in real-time, determine an intent associated with the user. For example, if the option to initiate the communications session 404 was provided through a checkout page and with a particular incentive for initiating the communications session 404, the brand platform service 102 may determine that the intent is associated with a user's interest in learning more about the particular incentive as related to the user's purchase. Based on this intent, the agent bot 104 may tailor its initial message to the user through the communications session 404. For example, as illustrated in FIG. 4A, the agent 104 may introduce itself as "Victor," thank the user for their purchase (as determined based on user interactions with the checkout page), and prompt the user to determine whether they would be interested in signing up for a rewards program provided by the brand 108. Further, to entice the user to sign up for this rewards program, the agent bot 104 may provide the user with a particular incentive (e.g., "earn 10% of your next purchase").

As noted above, for a particular intent, an opt-in offer may be associated with one or more particular incentives. As an illustrative example, if the identified intent corresponds to a user purchase of one or more items associated with the brand 108, the opt-in offer may be provided with an incentive that includes a discount towards a future purchase from the brand 108 if the user accepts the opt-in offer. As another illustrative example, if the identified intent corresponds to a request to enroll in a rewards program associated with the brand 108, the opt-in offer may be provided with an incentive for bonus rewards program points for a limited time if the user accepts the opt-in offer. Thus, the provided incentive may be tailored according to the identified intent.

It should be noted that, in some instances, the user's intent may be determined in real-time based on the messages exchanged between the user and the agent bot 104 over the communications session 404 as these messages are exchanged. For instance, the brand platform service 102 may train and implement a machine learning algorithm or artificial intelligence to automatically process these exchanged messages in real-time and as these messages are exchanged between the user and the agent bot 104 to identify and extract an intent from these messages. Based on the identified intent, the brand platform service 102 may determine what incentives may be provided with the opt-in offer to the user over the communications session 404, as described above.

In an embodiment, if an opt-in offer is communicated to the user through the communications session 404, the brand platform service 102 executes an integration bot 106 that is implemented to automatically process any messages exchanged through the communications session 404 in real-time and as these messages are exchanged to determine if the user has either accepted or rejected the presented opt-in offer. For example, as illustrated in FIG. 4A, in response to the opt-in offer provided by the agent bot 104, the user has indicated that they accept the offer (e.g., "Yes, that sounds great!" in response to the offer to sign up for the brand's rewards program). The integration bot 106 may automatically, and in real-time, process this message to determine that the user has opted to accept the presented offer.

In response to the user's acceptance of the presented opt-in offer, the integration bot 106 may automatically, and in real-time, transmit an instruction to the agent bot 104 to prompt the user for their contact information over the communications session 404. As noted above, this contact information may be used by the integration bot 106 to engage the user in a separate communications session to confirm that the user accepts the opt-in offer presented over the communications session 404. In some instances, the integration bot 106 may automatically select the communications channel that is to be used for the separate communications session. For example, if the user has been authenticated by the brand 108, the integration bot 106 may identify, from the brand 108, communications channels that the user is known to utilize. Based on this information, the integration bot 106 may select a particular communications channel for the separate communications session and instruct the agent bot 104 to prompt the user over the communications session 404 for contact information corresponding to the selected communications channel. For example, as illustrated in FIG. 4A, the user may be known to utilize their mobile device for different communications. Accordingly, the integration bot 106 may instruct the agent bot 104 to prompt the user, over the communications session 404, for their mobile phone number.

The integration bot 106 may continue to monitor, in real-time, the messages exchanged between the user and the agent bot 104 as these messages are exchanged in order to determine whether the user has supplied the requested contact information. For example, as illustrated in FIG. 4A, the user, through the communications session 404, has provided their mobile phone number (e.g., "Sure! It's XXX-867-5309."). The integration bot 106 may automatically process this message to obtain the user's mobile telephone number.

As illustrated in FIG. 4B, the integration bot 106 may use the contact information provided by the user to initiate a separate communications session with the user, such as through the user's mobile device 406. For example, the integration bot 106, using the contact information provided by the user through the communications session 404, may transmit an SMS message to the user. The user, through their mobile device 406, may receive this SMS message through an SMS application 408 (e.g., a text message application, an instant messaging application, etc.). As noted above, through the separate communications session, the integration bot 106 may prompt the user to confirm that they accept the opt-in offer presented by the agent bot 104 through the communications session 404. The integration bot 106 may further indicate that it is associated with the agent bot 104 in order to allow the user to verify that the separate communications session has been established between the user and the integration bot 106. For example, as illustrated in FIG. 4B, the integration bot 106 may refer to itself as "Victor" when communicating with the user via the separate communications session (e.g., the SMS application 408). This may coincide with the agent bot 104 introducing itself to the user as "Victor" through the communications session 404, as illustrated in FIG. 4A.

The integration bot 106 may monitor the messages exchanged between the integration bot 106 and the user through the separate communications session (e.g., the SMS application 408) in real-time as these messages are exchanged to determine whether the user has provided confirmation with regard to their acceptance of the opt-in offer. For example, as illustrated in FIG. 4B, if the user responds to the prompt from the integration bot 106 to confirm their acceptance of the opt-in offer with an affirmative response (e.g., "YES"), the integration bot 106 may detect that the user has provided their confirmation with regard to their acceptance of the opt-in offer. As noted above, if the user both accepts the opt-in offer and provided their confirmation with regard to their acceptance of the opt-in offer, the integration bot 106 may provide the user's opt-in authorization to the brand 108. The opt-in authorization may include the user's acceptance of the opt-in offer and subsequent confirmation, as well as any contact information associated with the user that may be used by the brand 108 to provide the user with any supplemental communications generated by the brand 108 or other entities associated with the brand 108 (e.g., third-party advertisers, brand affiliates, brand partners, etc.).

In addition to providing the user's opt-in authorization to the brand 108, the integration bot 106 may transmit a notification or other indication to the agent bot 104 to indicate that the acceptance of the opt-in offer has been confirmed by the user. In response, the agent bot 104 may transmit a message to the user, such as through the communications session 404, to indicate that the user's confirmation has been received and that the user has been enrolled to receive supplemental communications from the brand 108. For example, as illustrated in FIG. 4C, the agent bot 104 may indicate that the user's confirmation has been received and that the user has been signed up for the brand's rewards program. Further, the agent bot 104, through the communications session 404, may indicate that the user is set to receive the incentive advertised to the user for acceptance of the opt-in offer. For example, as illustrated in FIG. 4C, the agent bot 104 may indicate that it (or the brand 108) has sent the user a coupon for 10% off their next purchase.

Figure 5:
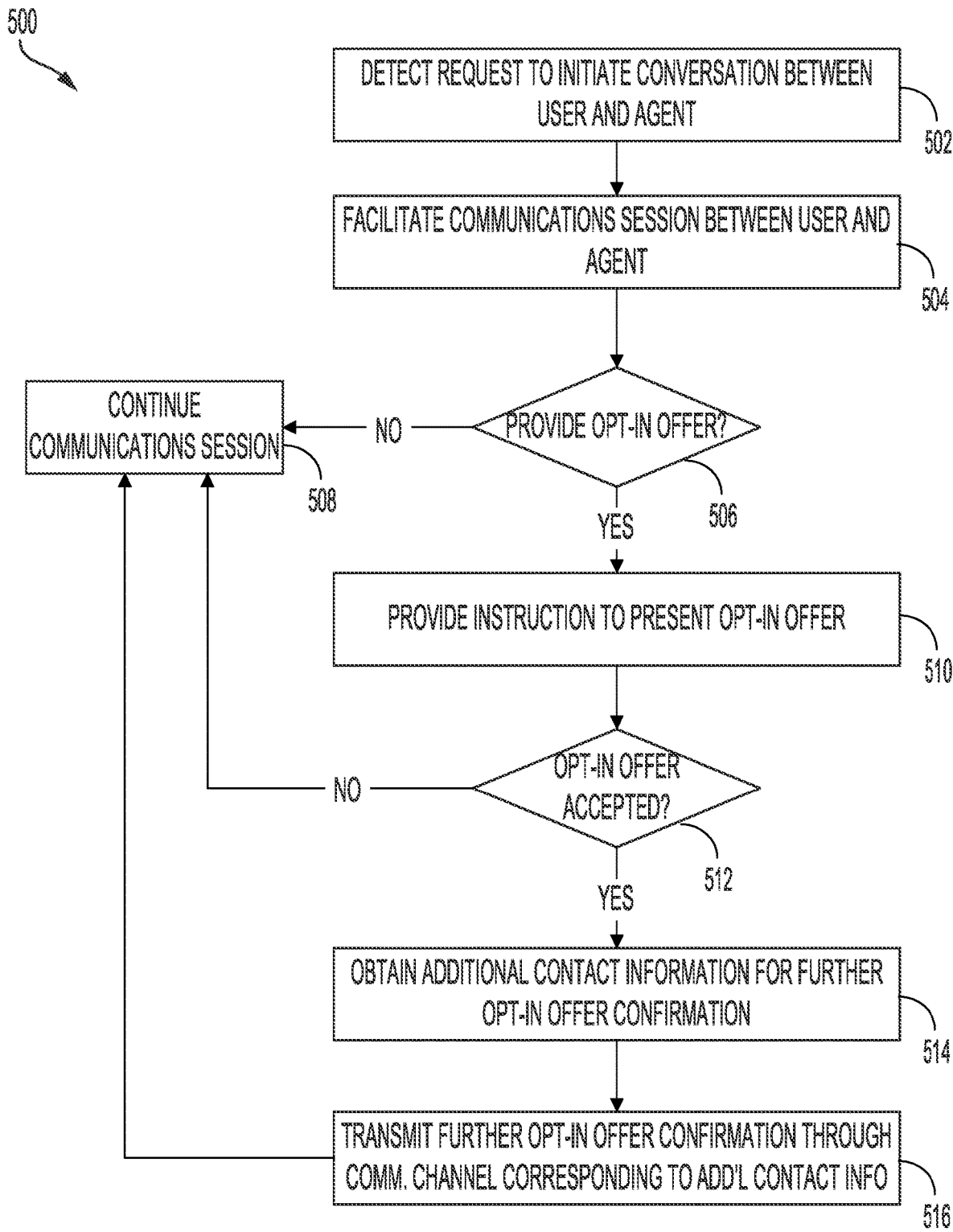
FIG. 5 shows an illustrative example of a process for facilitating a communications session between a user and an agent bot to provide an opt-in offer for supplemental communications associated with a brand and to obtain authorization to establish another communications session to obtain confirmation for an acceptance of the opt-in offer in accordance with at least one embodiment.

FIG. 5 shows an illustrative example of a process 500 for facilitating a communications session between a user and an agent bot to provide an opt-in offer for supplemental communications associated with a brand and to obtain authorization to establish another communications session to obtain confirmation for an acceptance of the opt-in offer in accordance with at least one embodiment. The process 500 may be performed by a user messaging system and automated bot system implemented by a brand platform service. The user messaging system and the automated bot system may function in unison to facilitate communications sessions between users and bots in order to provide these users with opt-in offers for supplemental communications from brands associated with the brand platform service.

At step 502, the user messaging system may detect a request to initiate a conversation (e.g., communications session) between a user and an agent (e.g., an agent bot, a live agent, etc.). As noted above, the brand platform service may provide, such as through a website or application implemented by the brand or otherwise associated with the brand, an option through which a user may submit a request to initiate a communications session with an agent. The user's selection of the presented option may be indicative of a user request to initiate a communications session with an agent. Thus, if the user selects the presented option, the user messaging system may detect the user's request to initiate the communications session with an agent.

At step 504, in response to detecting the user's request to initiate a communications session with an agent, the user messaging system may facilitate a communications session between the user and an agent. In an embodiment, the user messaging system determines, in real-time, whether to facilitate the communications session with either a live agent or an agent bot. For instance, based on the contextual information garnered through monitoring of user interactions, the user messaging system may determine whether the communications session is to be established between the user and either a live agent or an agent bot. In some instances, the user messaging system may automatically facilitate a communications session between the user and a live agent by default, regardless of the contextual information garnered through monitoring of user interactions.

Once the communications session has been facilitated between the user and the agent, the user messaging system may determine, at step 506, whether to provide the user, through the communication session, with an opt-in offer for supplemental communications from a brand. For example, if the option to initiate a communications session with an agent was provided with an incentive for signing up for supplemental communications from the brand, the user messaging system may automatically determine that an opt-in offer corresponding to the ask for signing up for supplemental communications may be provided to the user through the communications session. However, if the communications session is not associated with an opt-in offer (e.g., the communications session is facilitated between the user and the agent in order to resolve a technical issue that is not related to offers for supplemental communications, etc.), the user messaging system, at step 508, may allow the agent to continue the communications session with the user without presenting an opt-in offer for supplemental communications from the brand.

If the user messaging system determines that an opt-in offer for supplemental communications from the brand may be provided to the user, the user messaging system, at step 510, may provide an instruction to the agent associated with the communications session to present the opt-in offer to the user. Additionally, in some instances, the user messaging system may determine whether to provide the user with one or more incentives to accept the opt-in offer. As noted above, these incentives may be identified using a machine learning algorithm or artificial intelligence implemented by the user messaging system based on similar users, corresponding incentives offered to these similar users, and the decisions made by similar users regarding opt-in offers provided to these similar users. The user messaging system may use any available user information, such as user information from the brand or otherwise garnered through the messages exchanged between the user and the agent as input to the machine learning algorithm or artificial intelligence to identify the incentives that may be offered to the user.

As noted above, if an opt-in offer is communicated to the user over the communications session between the user and the agent, the user messaging system may transmit a request to the automated bot system to execute an integration bot that may be implemented to monitor, in real-time, messages communicated between the user and the agent as these messages are exchanged to determine whether the user has accepted a presented opt-in offer. In some instances, if the communications session is facilitated between the user and an agent bot (or other automated process), the agent bot may automatically execute the integration bot when the opt-in offer is communicated to the user. Accordingly, the integration bot may determine, at step 512, whether the user has accepted the presented opt-in offer. If the integration bot determines that the user has not accepted the opt-in offer (e.g., the user has explicitly rejected the opt-in offer, a pre-defined period of time for acceptance of the offer has elapsed without a response, etc.), the integration bot may allow for the communications session to continue (step 508) and automatically terminate.

If the integration bot determines that the user has accepted the presented opt-in offer, the integration bot, at step 514, may obtain additional contact information associated with the user for further communications with the user to obtain confirmation of the user's opt-in offer acceptance. As noted above, the integration bot may automatically, and in real-time, transmit an instruction to the agent to prompt the user for their contact information. This contact information may be used by the integration bot to establish a second communications session with the user through an alternative communications channel associated with the provided contact information. In some examples, the integration bot may automatically select the communications channel that is to be used for the second communications session with the user. Accordingly, the integration bot may transmit an instruction to the agent to prompt the user for contact information corresponding to the selected communications channel.

Once the integration bot has obtained the additional contact information from the user through the communications session between the user and the agent, the integration bot, at step 516, may transmit a request to the user through the alternative communications channel corresponding to the obtained contact information to confirm the user's acceptance of the previously presented opt-in offer. This alternative communications session may be facilitated in real-time while the original communications session between the user and the agent is ongoing. Through this alternative communications session, the integration bot may indicate that it is associated with the agent in order to allow the user to verify that the alternative communications session has been established between the user and the integration bot and pertains to the opt-in offer. Once the integration bot has obtained a response from the user through the alternative communications session either confirming or rejecting their prior approval of the opt-in offer, the integration bot may provide the agent with this response, as described above. The original communications session between the user and agent may continue regardless of whether the user confirms acceptance of the opt-in offer or rejects the opt-in offer.

Figure 6:
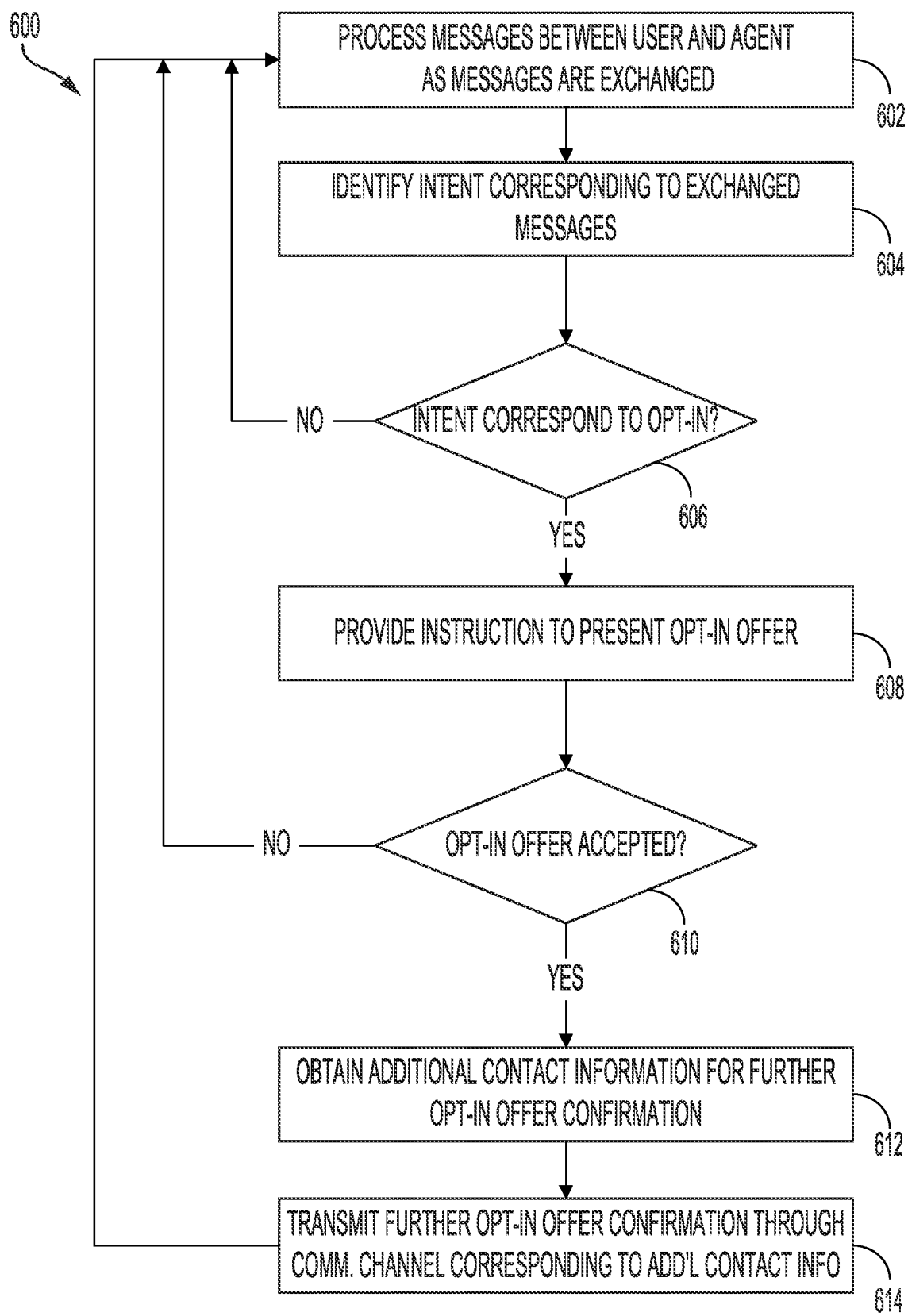
FIG. 6 shows an illustrative example of a process for automatically and in real-time processing messages between a user and an agent bot as the messages are exchanged to determine whether to present an opt-in offer for supplemental communications in accordance with at least one embodiment.

FIG. 6 shows an illustrative example of a process 600 for automatically and in real-time processing messages between a user and an agent bot as the messages are exchanged to determine whether to present an opt-in offer for supplemental communications in accordance with at least one embodiment. The process 600 may be performed by a user messaging system and automated bot system implemented by a brand platform service. Further, the process 600 may be performed during the communications session between the user and an agent bot, through which an opt-in offer to receive supplemental communications from a brand may be presented to the user.

At step 602, the user messaging system may process the messages exchanged between the user and the agent over the communications session in real-time as these messages are exchanged. As noted above, the user messaging system may implement an intent extraction engine that is configured to automatically process messages between the user and the agent in real-time as these messages are exchanged to automatically identify, at step 604, an intent associated with these messages. The intent extraction engine may implement a machine learning algorithm or artificial intelligence that is trained to perform a semantic analysis of these exchanged messages to identify an intent expressed in these messages. In some instances, the identified intent may be presented to the user to determine whether the identified intent corresponds to the messages submitted by the user. The response from the user may be used to further train the machine learning algorithm or artificial intelligence to better identify the intent from the exchanged messages.

At step 606, the user messaging system may determine whether the identified intent corresponds to an opportunity to present an opt-in offer for supplemental communications from a brand to the user over the communications session. For instance, the user messaging system may determine whether there is an existing association between the identified intent and an opt-in offer that may be communicated to the user. As noted above, the user messaging system may implement an opt-in determination engine that maintains associations between different intents and opt-in offer determinations. The opt-in determination engine may query the maintained associations to determine whether the identified intent corresponds to any of these maintained associations. If so, the opt-in determination engine may review the association to determine the opt-in offer that may be presented to the user. In addition to identifying an association between the identified intent and an opt-in offer, the opt-in determination engine may determine whether the opt-in offer is associated with one or more incentives that may be presented with the opt-in offer to entice the user to accept the opt-in offer.

If the user messaging system determines that the identified intent does not correspond to an opportunity for presentation of an opt-in offer for supplemental communications from the brand, the user messaging system may continue to process messages exchanged between the user and the agent over the communications session in real-time and as these messages are exchanged, thereby restarting the process 600. This may allow the user messaging system to dynamically, and in real-time, identify any new intents as messages are exchanged between the user and the agent and to determine, based on these new intents, whether to present the user with an opt-in offer for supplemental communications from the brand.

If the user messaging system, through the opt-in determination engine, determines that the identified intent corresponds to an opportunity for presentation of an opt-in offer for supplemental communications from the brand, the user messaging system, at step 608, may provide an instruction to the agent to present the opt-in offer to the user over the communications session. The instruction may indicate a format for which the opt-in offer is to be presented (e.g., how the opt-in offer is to be communicated to the user, the tone to be used in communicating the opt-in offer to the user, etc.). Additionally, the instruction may indicate what one or more incentives may be presented to the user in addition to the opt-in offer to entice the user to accept the opt-in offer.

Similar to the process 500 described above, if an opt-in offer is communicated to the user, the user messaging system may transmit a request to the automated bot system to execute an integration bot that may be implemented to monitor, in real-time, messages communicated between the user and the agent as these messages are exchanged. The integration bot may process these messages, in real-time and as these messages are exchanged, to determine whether the user has accepted a presented opt-in offer. In some instances, if the communications session is facilitated between the user and an agent bot (or other automated process), the agent bot may automatically execute the integration bot when the opt-in offer is communicated to the user. Accordingly, the integration bot may determine, at step 612, whether the user has accepted the presented opt-in offer. If the integration bot determines that the user has not accepted the opt-in offer, the integration bot may automatically terminate. Further, the user messaging system may continue to process any new messages between the user and agent in real-time as these messages are exchanged, thereby restarting the process 600.

If the opt-in offer presented by the agent to the user through communications session is accepted, the integration bot, at step 612, may obtain additional contact information associated with the user. This additional contact information may be used by the integration bot to establish an alternative communications session through which the integration bot may communicate a request to the user to confirm their acceptance of the opt-in offer. As noted above, the integration bot may automatically, and in real-time, transmit an instruction to the agent to prompt the user for their contact information. In some examples, the integration bot may automatically select the communications channel that is to be used for the second communications session with the user. Accordingly, the integration bot may transmit an instruction to the agent to prompt the user for the user's contact information corresponding to the selected communications channel.

At step 614, the integration bot may transmit a request to the user through the alternative communications channel corresponding to the obtained contact information to confirm the user's acceptance of the previously presented opt-in offer. Similar to the process 500 described above, this alternative communications session may be facilitated in real-time while the original communications session between the user and the agent is ongoing. Through this alternative communications session, the integration bot may indicate that it is associated with the agent in order to allow the user to verify that the alternative communications session has been established between the user and the integration bot and pertains to the opt-in offer. Once the integration bot has obtained a response from the user through the alternative communications session either confirming or rejecting their prior approval of the opt-in offer, the integration bot may provide the agent with this response, as described above. The original communications session between the user and agent may continue regardless of whether the user confirms acceptance of the opt-in offer or rejects the opt-in offer, thus restarting the process 600.

Figure 7:
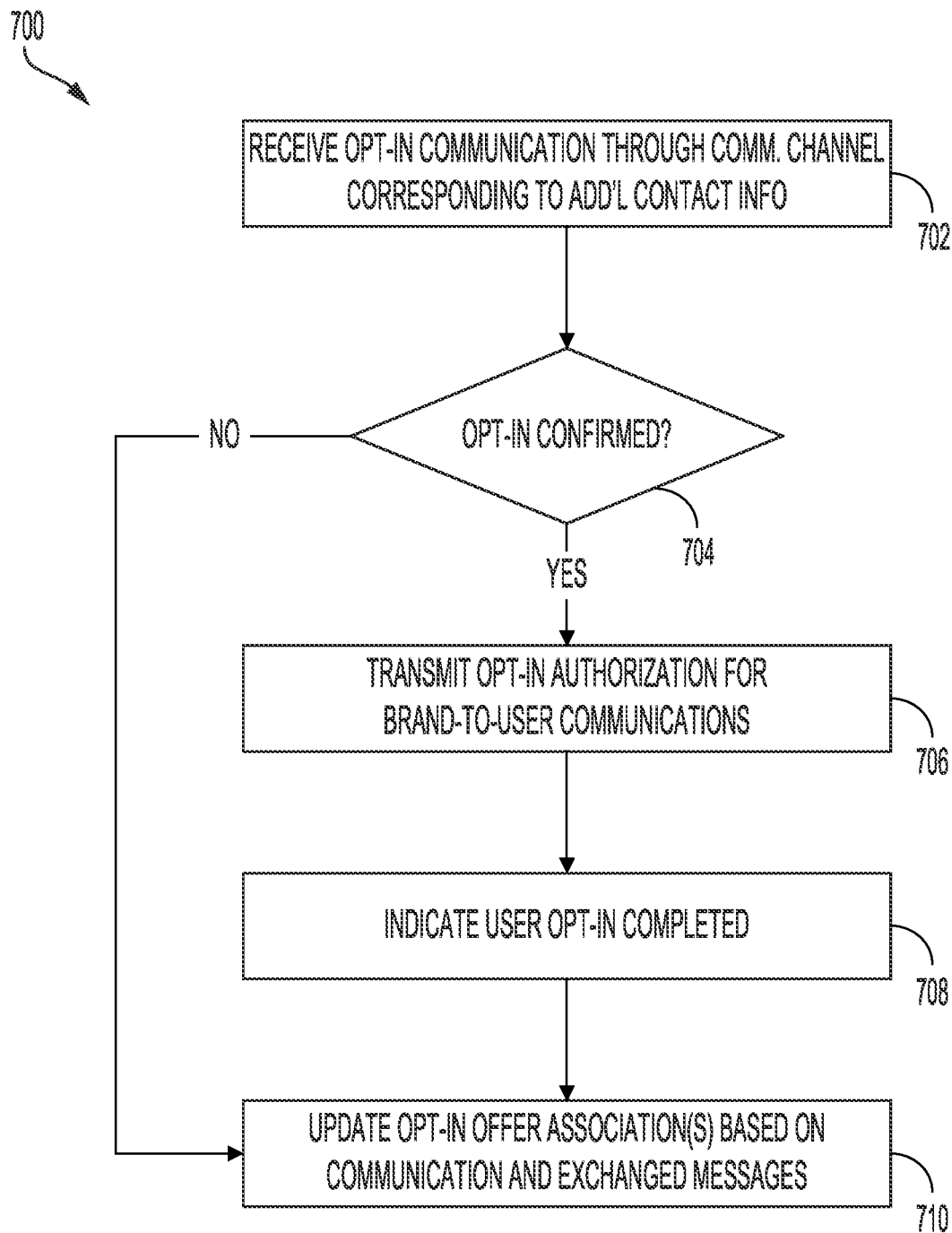
FIG. 7 shows an illustrative example of a process for obtaining an opt-in confirmation for supplemental communications associated with a brand and providing authorization for delivery of the supplemental communications in accordance with at least one embodiment.

FIG. 7 shows an illustrative example of a process 700 for obtaining an opt-in confirmation for supplemental communications associated with a brand and providing authorization for delivery of the supplemental communications in accordance with at least one embodiment. The process 700 may be performed by an automated bot system associated with the brand platform service. As noted above, the automated bot system may implement one or more agent bots that may be configured to autonomously communicate with users through communications sessions facilitated by the user messaging system. Further, the automated bot system may implement one or more integration bots that may be executed when an opt-in offer is communicated to users through the aforementioned communications sessions. Further, these integration bots may establish separate communications sessions with these users to confirm their acceptance of presented opt-in offers provided by the agent bots.

At step 702, an integration bot executed by the automated bot system may receive an opt-in communication through a separate communications session corresponding to a particular communications channel. The particular communications channel may correspond to the contact information provided by a user through the communications session established between the user and the agent bot. As noted above, if the user accepts an opt-in offer through the original communications session between the user and the agent bot, the integration bot may automatically, and in real-time, transmit an instruction to the agent bot to prompt the user for their contact information. The integration bot may continuously, and in real-time, process any subsequent messages exchanged over the communications session as these messages are received to determine whether the user has provided their contact information in response to the prompt. Using this obtained contact information, the integration bot may establish the separate communications session with the user in order to prompt the user to confirm their acceptance of the opt-in offer. Thus, through this separate communications session, the integration bot may automatically, and in real-time, monitor any messages exchanged between the integration bot and the user as these messages are received to obtain an opt-in communication from the user.

At step 704, the integration bot may determine whether the user has confirmed their acceptance of the opt-in offer presented to the user through the original communications session. For instance, if the user transmits an affirmative response to the prompt from the integration bot (e.g., "Yes," "Confirmed," "I approve," etc.), the integration bot may use NLP or other artificial intelligence to extract the affirmative response and determine that the user has confirmed their acceptance of the opt-in offer. Alternatively, if the user transmits a negative response to this prompt (e.g., "No," "I changed my mind," "I don't want to sign up anymore," etc.), the integration bot may use NLP or other artificial intelligence to extract the negative response and determine that the user has rejected the opt-in offer.

If the integration bot determines that the user has refused to confirm their acceptance of the opt-in offer (e.g., the user explicitly indicates that they do not wish to provide confirmation, a pre-defined period of time has elapsed without a confirmation, etc.), the integration bot may transmit a notification to the agent bot to indicate that the user has not provided confirmation for acceptance of the opt-in offer. This may cause the agent bot to transmit a message to the user, over the messaging interface, to indicate that the user has not confirmed their acceptance of the previously presented opt-in offer. Additionally, at step 710, the automated bot system may update any opt-in offer associations based on the user's refusal to confirm their acceptance of the opt-in offer. For instance, the automated bot system may provide this refusal to confirm the opt-in offer to the opt-in determination engine implemented by the user messaging system, which may determine whether to dynamically adjust the association between the intent associated with the original communications session and the presented opt-in offer. For example, the opt-in determination engine may adjust the association between the intent associated with the original communications session and the opt-in offer such that the opt-in offer is no longer presented for the particular intent. As another illustrative example, the opt-in determination engine may change the incentives provided with the opt-in offer in order to better entice users to accept the opt-in offer and to provide confirmation for their acceptance of the opt-in offer.

If the integration bot determines that the user has confirmed their acceptance of the opt-in offer, the integration bot, at step 706, may transmit an opt-in authorization message to the brand to allow for delivery of supplemental communications from the brand to the user. The brand, in response to receiving this opt-in authorization, may store the opt-in authorization within a opt-in datastore maintained by the brand. The opt-in authorization provided by the integration bot may include the contact information associated with the user and that may be used by the brand to transmit the supplemental communications to the user. When the brand is to ready to transmit supplemental communications, the brand may automatically query the opt-in datastore to retrieve the contact information associated with the user and use the retrieved contact information to provide the supplemental communications to the user.

In addition to transmitting the opt-in authorization to the brand, the integration bot, at step 708, may indicate that the user's request to opt-in to supplemental communications from the brand has been completed and fulfilled. For instance, the integration bot may transmit a notification or other indication to the agent bot to indicate that the acceptance of the opt-in offer has been confirmed by the user. In response, the agent bot may transmit a message to the user to indicate that the user's confirmation has been received and that the user has been enrolled to receive supplemental communications from the brand.

Once the integration bot has indicated that the user's request to opt-in to supplemental communications has been completed and fulfilled, the automated bot system, at step 710, may update the opt-in offer associations based on the user's confirmation and on the exchanged messages amongst the user, agent bot, and integration bot. For example, the integration bot, through the automated bot system, may provide the user's confirmation to the opt-in determination engine, which may reinforce the association between the intent identified through the original communications session and the opt-in offer presented to the user such that the likelihood of the opt-in offer being presented to similar users for similar intents is increased. Further, the opt-in determination engine may reinforce the machine learning algorithm or artificial intelligence used to dynamically determine what incentives are to be offered with the opt-in offer such that, for similar users and intents, the previously provided incentives may be provided with the opt-in offer presented to these similar users for similar intents.

Figure 8:
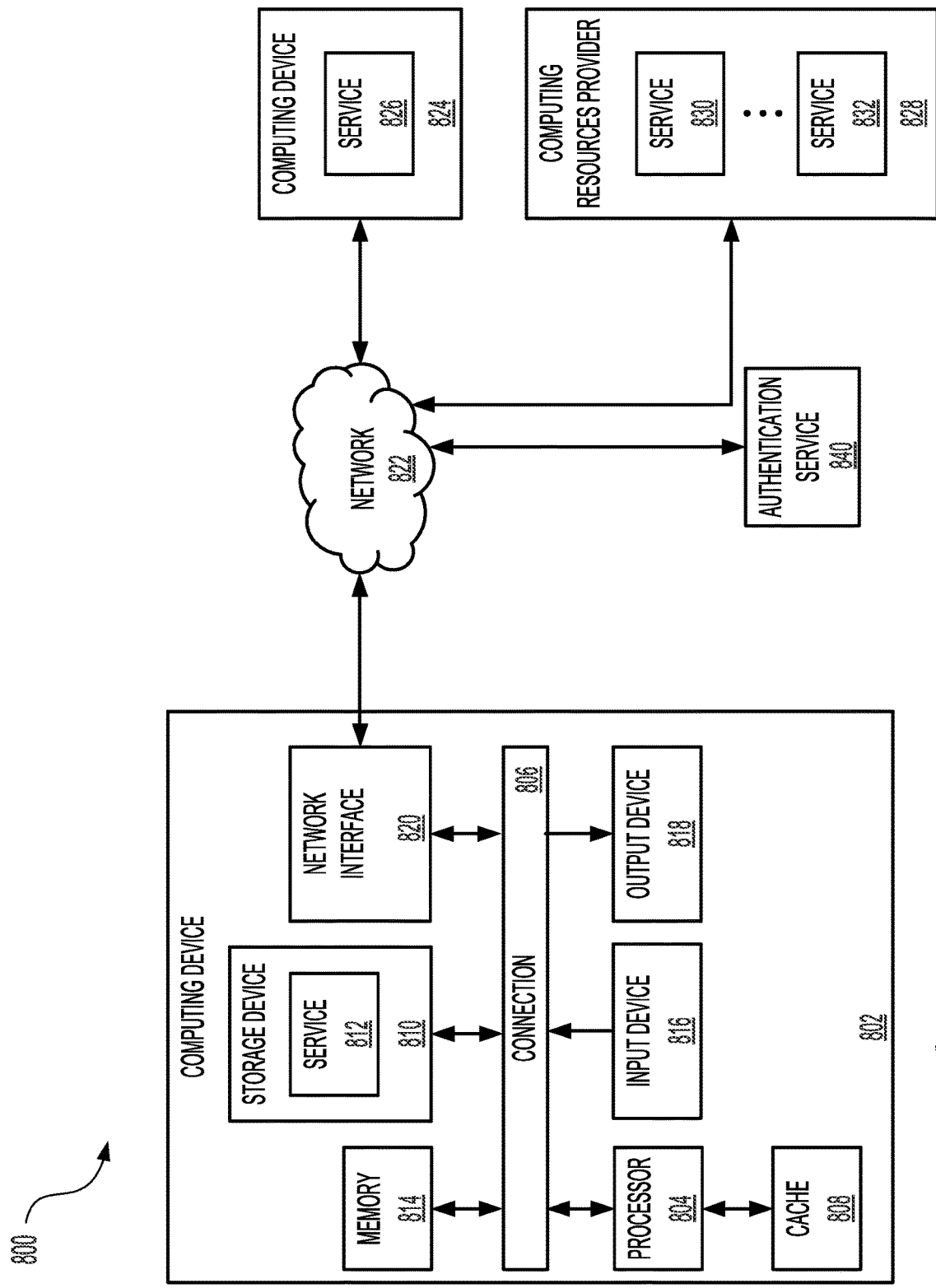
FIG. 8 shows an illustrative example of an environment in which various embodiments can be implemented.

FIG. 8 illustrates a computing system architecture 800, including various components in electrical communication with each other, in accordance with some embodiments. The example computing system architecture 800 illustrated in FIG. 8 includes a computing device 802, which has various components in electrical communication with each other using a connection 806, such as a bus, in accordance with some implementations. The example computing system architecture 800 includes a processing unit 804 that is in electrical communication with various system components, using the connection 806, and including the system memory 814. In some embodiments, the system memory 814 includes read-only memory (ROM), random-access memory (RAM), and other such memory technologies including, but not limited to, those described herein. In some embodiments, the example computing system architecture 800 includes a cache 808 of high-speed memory connected directly with, in close proximity to, or integrated as part of the processor 804. The system architecture 800 can copy data from the memory 814 and/or the storage device 810 to the cache 808 for quick access by the processor 804. In this way, the cache 808 can provide a performance boost that decreases or eliminates processor delays in the processor 804 due to waiting for data. Using modules, methods and services such as those described herein, the processor 804 can be configured to perform various actions. In some embodiments, the cache 808 may include multiple types of cache including, for example, level one (L1) and level two (L2) cache. The memory 814 may be referred to herein as system memory or computer system memory. The memory 814 may include, at various times, elements of an operating system, one or more applications, data associated with the operating system or the one or more applications, or other such data associated with the computing device 802.

Other system memory 814 can be available for use as well. The memory 814 can include multiple different types of memory with different performance characteristics. The processor 804 can include any general purpose processor and one or more hardware or software services, such as service 812 stored in storage device 810, configured to control the processor 804 as well as a special-purpose processor where software instructions are incorporated into the actual processor design. The processor 804 can be a completely self-contained computing system, containing multiple cores or processors, connectors (e.g., buses), memory, memory controllers, caches, etc. In some embodiments, such a self-contained computing system with multiple cores is symmetric. In some embodiments, such a self-contained computing system with multiple cores is asymmetric. In some embodiments, the processor 804 can be a microprocessor, a microcontroller, a digital signal processor ("DSP"), or a combination of these and/or other types of processors. In some embodiments, the processor 804 can include multiple elements such as a core, one or more registers, and one or more processing units such as an arithmetic logic unit (ALU), a floating point unit (FPU), a graphics processing unit (GPU), a physics processing unit (PPU), a digital system processing (DSP) unit, or combinations of these and/or other such processing units.

To enable user interaction with the computing system architecture 800, an input device 816 can represent any number of input mechanisms, such as a microphone for speech, a touch-sensitive screen for gesture or graphical input, keyboard, mouse, motion input, pen, and other such input devices. An output device 818 can also be one or more of a number of output mechanisms known to those of skill in the art including, but not limited to, monitors, speakers, printers, haptic devices, and other such output devices. In some instances, multimodal systems can enable a user to provide multiple types of input to communicate with the computing system architecture 800. In some embodiments, the input device 816 and/or the output device 818 can be coupled to the computing device 802 using a remote connection device such as, for example, a communication interface such as the network interface 820 described herein. In such embodiments, the communication interface can govern and manage the input and output received from the attached input device 816 and/or output device 818. As may be contemplated, there is no restriction on operating on any particular hardware arrangement and accordingly the basic features here may easily be substituted for other hardware, software, or firmware arrangements as they are developed.

In some embodiments, the storage device 810 can be described as non-volatile storage or non-volatile memory. Such non-volatile memory or non-volatile storage can be a hard disk or other types of computer readable media which can store data that are accessible by a computer, such as magnetic cassettes, flash memory cards, solid state memory devices, digital versatile disks, cartridges, RAM, ROM, and hybrids thereof.

As described herein, the storage device 810 can include hardware and/or software services such as service 812 that can control or configure the processor 804 to perform one or more functions including, but not limited to, the methods, processes, functions, systems, and services described herein in various embodiments. In some embodiments, the hardware or software services can be implemented as modules. As illustrated in example computing system architecture 800, the storage device 810 can be connected to other parts of the computing device 802 using the system connection 806. In an embodiment, a hardware service or hardware module such as service 812, that performs a function can include a software component stored in a non-transitory computer-readable medium that, in connection with the necessary hardware components, such as the processor 804, connection 806, cache 808, storage device 810, memory 814, input device 816, output device 818, and so forth, can carry out the functions such as those described herein.

The disclosed brand platform service, the systems of the brand platform service, and the systems and methods for dynamically implementing automated bots configured to automatically and in real-time process messages exchanged with a user to determine whether to present an opt-in offer for supplemental communications can be performed using a computing system such as the example computing system illustrated in FIG. 8, using one or more components of the example computing system architecture 800. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device.

In some embodiments, the processor can be configured to carry out some or all of methods and systems for dynamically, and in real-time, identifying one or more conditions associated with an obtained invoice described herein by, for example, executing code using a processor such as processor 804 wherein the code is stored in memory such as memory 814 as described herein. One or more of a user device, a provider server or system, a database system, or other such devices, services, or systems may include some or all of the components of the computing system such as the example computing system illustrated in FIG. 8, using one or more components of the example computing system architecture 800 illustrated herein. As may be contemplated, variations on such systems can be considered as within the scope of the present disclosure.

This disclosure contemplates the computer system taking any suitable physical form. As example and not by way of limitation, the computer system can be an embedded computer system, a system-on-chip (SOC), a single-board computer system (SBC) (such as, for example, a computer-on-module (COM) or system-on-module (SOM)), a desktop computer system, a laptop or notebook computer system, a tablet computer system, a wearable computer system or interface, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud computing system which may include one or more cloud components in one or more networks as described herein in association with the computing resources provider 828. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor 804 can be a conventional microprocessor such as an Intel® microprocessor, an AMD® microprocessor, a Motorola® microprocessor, or other such microprocessors. One of skill in the relevant art will recognize that the terms "machine-readable (storage) medium" or "computer-readable (storage) medium" include any type of device that is accessible by the processor.

The memory 814 can be coupled to the processor 804 by, for example, a connector such as connector 806, or a bus. As used herein, a connector or bus such as connector 806 is a communications system that transfers data between components within the computing device 802 and may, in some embodiments, be used to transfer data between computing devices. The connector 806 can be a data bus, a memory bus, a system bus, or other such data transfer mechanism. Examples of such connectors include, but are not limited to, an industry standard architecture (ISA" bus, an extended ISA (EISA) bus, a parallel AT attachment (PATA" bus (e.g., an integrated drive electronics (IDE) or an extended IDE (EIDE) bus), or the various types of parallel component interconnect (PCI) buses (e.g., PCI, PCIe, PCI-104, etc.).

The memory 814 can include RAM including, but not limited to, dynamic RAM (DRAM), static RAM (SRAM), synchronous dynamic RAM (SDRAM), non-volatile random access memory (NVRAM), and other types of RAM. The DRAM may include error-correcting code (EEC). The memory can also include ROM including, but not limited to, programmable ROM (PROM), erasable and programmable ROM (EPROM), electronically erasable and programmable ROM (EEPROM), Flash Memory, masked ROM (MROM), and other types or ROM. The memory 814 can also include magnetic or optical data storage media including read-only (e.g., CD ROM and DVD ROM) or otherwise (e.g., CD or DVD). The memory can be local, remote, or distributed.

As described herein, the connector 806 (or bus) can also couple the processor 804 to the storage device 810, which may include non-volatile memory or storage and which may also include a drive unit. In some embodiments, the non-volatile memory or storage is a magnetic floppy or hard disk, a magnetic-optical disk, an optical disk, a ROM (e.g., a CD-ROM, DVD-ROM, EPROM, or EEPROM), a magnetic or optical card, or another form of storage for data. Some of this data may be written, by a direct memory access process, into memory during execution of software in a computer system. The non-volatile memory or storage can be local, remote, or distributed. In some embodiments, the non-volatile memory or storage is optional. As may be contemplated, a computing system can be created with all applicable data available in memory. A typical computer system will usually include at least one processor, memory, and a device (e.g., a bus) coupling the memory to the processor.

Software and/or data associated with software can be stored in the non-volatile memory and/or the drive unit. In some embodiments (e.g., for large programs) it may not be possible to store the entire program and/or data in the memory at any one time. In such embodiments, the program and/or data can be moved in and out of memory from, for example, an additional storage device such as storage device 810. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The connection 806 can also couple the processor 804 to a network interface device such as the network interface 820. The interface can include one or more of a modem or other such network interfaces including, but not limited to those described herein. It will be appreciated that the network interface 820 may be considered to be part of the computing device 802 or may be separate from the computing device 802. The network interface 820 can include one or more of an analog modem, Integrated Services Digital Network (ISDN) modem, cable modem, token ring interface, satellite transmission interface, or other interfaces for coupling a computer system to other computer systems. In some embodiments, the network interface 820 can include one or more input and/or output (I/O) devices. The I/O devices can include, by way of example but not limitation, input devices such as input device 816 and/or output devices such as output device 818. For example, the network interface 820 may include a keyboard, a mouse, a printer, a scanner, a display device, and other such components. Other examples of input devices and output devices are described herein. In some embodiments, a communication interface device can be implemented as a complete and separate computing device.

In operation, the computer system can be controlled by operating system software that includes a file management system, such as a disk operating system. One example of operating system software with associated file management system software is the family of Windows® operating systems and their associated file management systems. Another example of operating system software with its associated file management system software is the Linux™ operating system and its associated file management system including, but not limited to, the various types and implementations of the Linux® operating system and their associated file management systems. The file management system can be stored in the non-volatile memory and/or drive unit and can cause the processor to execute the various acts required by the operating system to input and output data and to store data in the memory, including storing files on the non-volatile memory and/or drive unit. As may be contemplated, other types of operating systems such as, for example, MacOS®, other types of UNIX® operating systems (e.g., BSD™ and descendants, Xenix™ SunOS™, HP-UX®, etc.), mobile operating systems (e.g., iOS® and variants, Chrome®, Ubuntu Touch®, watchOS®, Windows 10 Mobile®, the Blackberry® OS, etc.), and real-time operating systems (e.g., VxWorks®, QNX®, eCos®, RTLinux®, etc.) may be considered as within the scope of the present disclosure. As may be contemplated, the names of operating systems, mobile operating systems, real-time operating systems, languages, and devices, listed herein may be registered trademarks, service marks, or designs of various associated entities.

In some embodiments, the computing device 802 can be connected to one or more additional computing devices such as computing device 824 via a network 822 using a connection such as the network interface 820. In such embodiments, the computing device 824 may execute one or more services 826 to perform one or more functions under the control of, or on behalf of, programs and/or services operating on computing device 802. In some embodiments, a computing device such as computing device 824 may include one or more of the types of components as described in connection with computing device 802 including, but not limited to, a processor such as processor 804, a connection such as connection 806, a cache such as cache 808, a storage device such as storage device 810, memory such as memory 814, an input device such as input device 816, and an output device such as output device 818. In such embodiments, the computing device 824 can carry out the functions such as those described herein in connection with computing device 802. In some embodiments, the computing device 802 can be connected to a plurality of computing devices such as computing device 824, each of which may also be connected to a plurality of computing devices such as computing device 824. Such an embodiment may be referred to herein as a distributed computing environment.

The network 822 can be any network including an internet, an intranet, an extranet, a cellular network, a Wi-Fi network, a local area network (LAN), a wide area network (WAN), a satellite network, a Bluetooth® network, a virtual private network (VPN), a public switched telephone network, an infrared (IR) network, an internet of things (IoT network) or any other such network or combination of networks. Communications via the network 822 can be wired connections, wireless connections, or combinations thereof. Communications via the network 822 can be made via a variety of communications protocols including, but not limited to, Transmission Control Protocol/Internet Protocol (TCP/IP), User Datagram Protocol (UDP), protocols in various layers of the Open System Interconnection (OSI) model, File Transfer Protocol (FTP), Universal Plug and Play (UPnP), Network File System (NFS), Server Message Block (SMB), Common Internet File System (CIFS), and other such communications protocols.

Communications over the network 822, within the computing device 802, within the computing device 824, or within the computing resources provider 828 can include information, which also may be referred to herein as content. The information may include text, graphics, audio, video, haptics, and/or any other information that can be provided to a user of the computing device such as the computing device 802. In an embodiment, the information can be delivered using a transfer protocol such as Hypertext Markup Language (HTML), Extensible Markup Language (XML), JavaScript®, Cascading Style Sheets (CSS), JavaScript® Object Notation (JSON), and other such protocols and/or structured languages. The information may first be processed by the computing device 802 and presented to a user of the computing device 802 using forms that are perceptible via sight, sound, smell, taste, touch, or other such mechanisms. In some embodiments, communications over the network 822 can be received and/or processed by a computing device configured as a server. Such communications can be sent and received using PHP: Hypertext Preprocessor ("PHP"), Python™, Ruby, Perl® and variants, Java®, HTML, XML, or another such server-side processing language.

In some embodiments, the computing device 802 and/or the computing device 824 can be connected to a computing resources provider 828 via the network 822 using a network interface such as those described herein (e.g. network interface 820). In such embodiments, one or more systems (e.g., service 830 and service 832) hosted within the computing resources provider 828 (also referred to herein as within "a computing resources provider environment") may execute one or more services to perform one or more functions under the control of, or on behalf of, programs and/or services operating on computing device 802 and/or computing device 824. Systems such as service 830 and service 832 may include one or more computing devices such as those described herein to execute computer code to perform the one or more functions under the control of, or on behalf of, programs and/or services operating on computing device 802 and/or computing device 824.

For example, the computing resources provider 828 may provide a service, operating on service 830 to store data for the computing device 802 when, for example, the amount of data that the computing device 802 exceeds the capacity of storage device 810. In another example, the computing resources provider 828 may provide a service to first instantiate a virtual machine (VM) on service 832, use that VM to access the data stored on service 832, perform one or more operations on that data, and provide a result of those one or more operations to the computing device 802. Such operations (e.g., data storage and VM instantiation) may be referred to herein as operating "in the cloud," "within a cloud computing environment," or "within a hosted virtual machine environment," and the computing resources provider 828 may also be referred to herein as "the cloud." Examples of such computing resources providers include, but are not limited to Amazon® Web Services (AWS®), Microsoft's Azure®, IBM Cloud®, Google Cloud®, Oracle Cloud® etc.

Services provided by a computing resources provider 828 include, but are not limited to, data analytics, data storage, archival storage, big data storage, virtual computing (including various scalable VM architectures), blockchain services, containers (e.g., application encapsulation), database services, development environments (including sandbox development environments), e-commerce solutions, game services, media and content management services, security services, serverless hosting, virtual reality (VR) systems, and augmented reality (AR) systems. Various techniques to facilitate such services include, but are not limited to, virtual machines, virtual storage, database services, system schedulers (e.g., hypervisors), resource management systems, various types of short-term, mid-term, long-term, and archival storage devices, etc.

As may be contemplated, the systems such as service 830 and service 832 may implement versions of various services (e.g., the service 812 or the service 826) on behalf of, or under the control of, computing device 802 and/or computing device 824. Such implemented versions of various services may involve one or more virtualization techniques so that, for example, it may appear to a user of computing device 802 that the service 812 is executing on the computing device 802 when the service is executing on, for example, service 830. As may also be contemplated, the various services operating within the computing resources provider 828 environment may be distributed among various systems within the environment as well as partially distributed onto computing device 824 and/or computing device 802.

In an embodiment, the computing device 802 can be connected to one or more additional computing devices and/or services such as an authentication service 840 via the network 822 and using a connection such as the network interface 820. In an embodiment, the authentication service 840 is executing as one or more services (e.g., the service 830 and/or the service 832) operating within the environment of the computing resources provider. As used herein, an authentication service 840 is a service used by one or more entities (such as brands, the brand platform service, etc.) to authenticate users engaged in communications sessions with automated bots, live agents, and other entities. An authentication service may be a third-party service that provides secure and verified authorization.

In an embodiment, elements of the authentication service 840 are running as an application or web service operating on a computing device such as the computing device 802 described herein. In such an embodiment, the application or web service of the authentication service 840 may be provided by a system (e.g., a bank, a transaction processing system, an inventory management system, or some other such system). In an embodiment, elements of the authentication service 840 are running on an auxiliary device or system configured to execute tasks associated with the authentication service 840. In an embodiment, elements of the authentication service 840 are running on virtual device such as those described herein. Although not illustrated here, in an embodiment, the authentication service 840 may be running on one or more of a plurality of devices that may be interconnected using a network such as the network 822.

Client devices, user devices, computer resources provider devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things such as those described herein. The input devices can include, for example, a keyboard, a mouse, a key pad, a touch interface, a microphone, a camera, and/or other types of input devices including, but not limited to, those described herein. The output devices can include, for example, a display screen, a speaker, a haptic feedback system, a printer, and/or other types of output devices including, but not limited to, those described herein. A data storage device, such as a hard drive or flash memory, can enable the computing device to temporarily or permanently store data. A network interface, such as a wireless or wired interface, can enable the computing device to communicate with a network. Examples of computing devices (e.g., the computing device 802) include, but is not limited to, desktop computers, laptop computers, server computers, hand-held computers, tablets, smart phones, personal digital assistants, digital home assistants, wearable devices, smart devices, and combinations of these and/or other such computing devices as well as machines and apparatuses in which a computing device has been incorporated and/or virtually implemented.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described herein. The computer-readable data storage medium may form part of a computer program product, which may include packaging materials. The computer-readable medium may comprise memory or data storage media, such as that described herein. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices (e.g., a combination of a DSP and a microprocessor), a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

As used herein, the term "machine-readable media" and equivalent terms "machine-readable storage media," "computer-readable media," and "computer-readable storage media" refer to media that includes, but is not limited to, portable or non-portable storage devices, optical storage devices, removable or non-removable storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), solid state drives (SSD), flash memory, memory or memory devices.

A machine-readable medium or machine-readable storage medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like. Further examples of machine-readable storage media, machine-readable media, or computer-readable (storage) media include but are not limited to recordable type media such as volatile and non-volatile memory devices, floppy and other removable disks, hard disk drives, optical disks (e.g., CDs, DVDs, etc.), among others, and transmission type media such as digital and analog communication links.

As may be contemplated, while examples herein may illustrate or refer to a machine-readable medium or machine-readable storage medium as a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

Some portions of the detailed description herein may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

It is also noted that individual implementations may be described as a process which is depicted as a flowchart, a flow diagram, a data flow diagram, a structure diagram, or a block diagram. Although a flowchart, a flow diagram, a data flow diagram, a structure diagram, or a block diagram may describe the operations as a sequential process, many of the operations can be performed in parallel or concurrently. In addition, the order of the operations may be re-arranged. A process illustrated in a figure is terminated when its operations are completed, but could have additional steps not included in the figure. A process may correspond to a method, a function, a procedure, a subroutine, a subprogram, etc. When a process corresponds to a function, its termination can correspond to a return of the function to the calling function or the main function.

In some embodiments, one or more implementations of an algorithm such as those described herein may be implemented using a machine learning or artificial intelligence algorithm. Such a machine learning or artificial intelligence algorithm may be trained using supervised, unsupervised, reinforcement, or other such training techniques. For example, a set of data may be analyzed using one of a variety of machine learning algorithms to identify correlations between different elements of the set of data without supervision and feedback (e.g., an unsupervised training technique). A machine learning data analysis algorithm may also be trained using sample or live data to identify potential correlations. Such algorithms may include k-means clustering algorithms, fuzzy c-means (FCM) algorithms, expectation-maximization (EM) algorithms, hierarchical clustering algorithms, density-based spatial clustering of applications with noise (DB SCAN) algorithms, and the like. Other examples of machine learning or artificial intelligence algorithms include, but are not limited to, genetic algorithms, backpropagation, reinforcement learning, decision trees, liner classification, artificial neural networks, anomaly detection, and such. More generally, machine learning or artificial intelligence methods may include regression analysis, dimensionality reduction, metalearning, reinforcement learning, deep learning, and other such algorithms and/or methods. As may be contemplated, the terms "machine learning" and "artificial intelligence" are frequently used interchangeably due to the degree of overlap between these fields and many of the disclosed techniques and algorithms have similar approaches.

As an example of a supervised training technique, a set of data can be selected for training of the machine learning model to facilitate identification of correlations between members of the set of data. The machine learning model may be evaluated to determine, based on the sample inputs supplied to the machine learning model, whether the machine learning model is producing accurate correlations between members of the set of data. Based on this evaluation, the machine learning model may be modified to increase the likelihood of the machine learning model identifying the desired correlations. The machine learning model may further be dynamically trained by soliciting feedback from users of a system as to the efficacy of correlations provided by the machine learning algorithm or artificial intelligence algorithm (i.e., the supervision). The machine learning algorithm or artificial intelligence may use this feedback to improve the algorithm for generating correlations (e.g., the feedback may be used to further train the machine learning algorithm or artificial intelligence to provide more accurate correlations).

The various examples of flowcharts, flow diagrams, data flow diagrams, structure diagrams, or block diagrams discussed herein may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments) such as those described herein. A processor(s), implemented in an integrated circuit, may perform the necessary tasks.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

It should be noted, however, that the algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC (e.g., an iPad®, a Microsoft Surface®, a Chromebook®, etc.), a laptop computer, a set-top box (STB), a personal digital assistant (PDA), a mobile device (e.g., a cellular telephone, an iPhone®, and Android® device, a Blackberry®, etc.), a wearable device, an embedded computer system, an electronic book reader, a processor, a telephone, a web appliance, a network router, switch or bridge, or any system capable of executing a set of instructions (sequential or otherwise) that specify actions to be taken by that system. The system may also be a virtual system such as a virtual version of one of the aforementioned devices that may be hosted on another computer device such as the computer device 802.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting or restricting the subject matter to the precise forms disclosed. Persons skilled in the relevant art can appreciate that many modifications and variations are possible in light of the above disclosure and may be made thereto without departing from the broader scope of the embodiments as set forth herein. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

As used herein, the terms "a" and "an" and "the" and other such singular referents are to be construed to include both the singular and the plural, unless otherwise indicated herein or clearly contradicted by context.

As used herein, the terms "comprising," "having," "including," and "containing" are to be construed as open-ended (e.g., "including" is to be construed as "including, but not limited to"), unless otherwise indicated or clearly contradicted by context.

As used herein, the recitation of ranges of values is intended to serve as a shorthand method of referring individually to each separate value falling within the range, unless otherwise indicated or clearly contradicted by context. Accordingly, each separate value of the range is incorporated into the specification as if it were individually recited herein.

As used herein, use of the terms "set" (e.g., "a set of items") and "subset" (e.g., "a subset of the set of items") is to be construed as a nonempty collection including one or more members unless otherwise indicated or clearly contradicted by context. Furthermore, unless otherwise indicated or clearly contradicted by context, the term "subset" of a corresponding set does not necessarily denote a proper subset of the corresponding set but that the subset and the set may include the same elements (i.e., the set and the subset may be the same).

As used herein, use of conjunctive language such as "at least one of A, B, and C" is to be construed as indicating one or more of A, B, and C (e.g., any one of the following nonempty subsets of the set {A, B, C}, namely: {A}, {B}, {C}, {A, B}, {A, C}, {B, C}, or {A, B, C}) unless otherwise indicated or clearly contradicted by context. Accordingly, conjunctive language such as "as least one of A, B, and C" does not imply a requirement for at least one of A, at least one of B, and at least one of C.

As used herein, the use of examples or exemplary language (e.g., "such as" or "as an example") is intended to more clearly illustrate embodiments and does not impose a limitation on the scope unless otherwise claimed. Such language in the specification should not be construed as indicating any non-claimed element is required for the practice of the embodiments described and claimed in the present disclosure.

As used herein, where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described herein. The elements and acts of the various examples described herein can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described herein to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described herein may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use.

What is claimed is:

1. A computer-implemented method comprising:
   dynamically detecting ongoing messages exchanged in real-time during a first communications session between a user and an agent bot;
   processing the ongoing messages in real-time as the ongoing messages are received to automatically determine whether to present an opt-in authorization request for supplemental communications, wherein the opt-in authorization request includes a prompt for contact information associated with the user;
   generating an instruction to present the opt-in authorization request, wherein when the instruction is received by the agent bot, the agent bot presents the opt-in authorization request through the first communications session;

monitoring the first communications session in real-time to detect approval of the opt-in authorization request and a message including the contact information associated with the user;

facilitating a second communications session according to the contact information, wherein when the second communication session is facilitated, an integration bot transmits an opt-in confirmation request through the second communications session;

receiving in real-time an opt-in confirmation responsive to the opt-in confirmation request through the second communications session; and providing the approval of the opt-in authorization request and the opt-in confirmation, wherein when the approval of the opt-in authorization request and the opt-in confirmation are received by a brand entity, the brand entity transmits the supplemental communications.

2. The computer-implemented method of claim 1, further comprising:

identifying in real-time an intent corresponding to the ongoing messages, wherein the intent is used to automatically determine whether to present the opt-in authorization request.

3. The computer-implemented method of claim 1, wherein the first communications session and the second communications session are distinct.

4. The computer-implemented method of claim 1, further comprising:

activating the integration bot in response to the agent bot presenting the opt-in authorization request through the first communications session, wherein when the integration bot is activated, the integration bot automatically monitors the first communications session to detect the approval of the opt-in authorization request.

5. The computer-implemented method of claim 1, wherein the contact information corresponds to a phone number associated with the user, and wherein the second communications session is facilitated using Short Message Service (SMS) messages.

6. The computer-implemented method of claim 1, further comprising:

dynamically updating the agent bot in real-time based on the ongoing messages, the approval of the opt-in authorization request, and the opt-in confirmation.

7. The computer-implemented method of claim 1, wherein the first communications session is transferred to the agent bot from a live agent based on an intent associated with previous messages exchanged between the user and the live agent over the first communications session.

8. A system, comprising:

one or more processors; and memory storing thereon instructions that, as a result of being executed by the one or more processors, cause the system to:

dynamically detect ongoing messages exchanged in real-time during a first communications session between a user and an agent bot;

process the ongoing messages in real-time as the ongoing messages are received to automatically determine whether to present an opt-in authorization request for supplemental communications, wherein the opt-in authorization request includes a prompt for contact information associated with the user;

generate an instruction to present the opt-in authorization request, wherein when the instruction is received by the agent bot, the agent bot presents the opt-in authorization request through the first communications session;

monitor the first communications session in real-time to detect approval of the opt-in authorization request and a message including the contact information associated with the user;

facilitate a second communications session according to the contact information, wherein when the second communication session is facilitated, an integration bot transmits an opt-in confirmation request through the second communications session;

receive in real-time an opt-in confirmation responsive to the opt-in confirmation request through the second communications session; and provide the approval of the opt-in authorization request and the opt-in confirmation, wherein when the approval of the opt-in authorization request and the opt-in confirmation are received by a brand entity, the brand entity transmits the supplemental communications.

9. The system of claim 8, wherein the instructions further cause the system to:

identify in real-time an intent corresponding to the ongoing messages, wherein the intent is used to automatically determine whether to present the opt-in authorization request.

10. The system of claim 8, wherein the first communications session and the second communications session are distinct.

11. The system of claim 8, wherein the instructions further cause the system to:

activate the integration bot in response to the agent bot presenting the opt-in authorization request through the first communications session, wherein when the integration bot is activated, the integration bot automatically monitors the first communications session to detect the approval of the opt-in authorization request.

12. The system of claim 8, wherein the contact information corresponds to a phone number associated with the user, and wherein the second communications session is facilitated using Short Message Service (SMS) messages.

13. The system of claim 8, wherein the instructions further cause the system to:

dynamically update the agent bot in real-time based on the ongoing messages, the approval of the opt-in authorization request, and the opt-in confirmation.

14. The system of claim 8, wherein the first communications session is transferred to the agent bot from a live agent based on an intent associated with previous messages exchanged between the user and the live agent over the first communications session.

15. A non-transitory, computer-readable storage medium storing thereon executable instructions that, as a result of being executed by one or more processors of a computer system, cause the computer system to:

dynamically detect ongoing messages exchanged in real-time during a first communications session between a user and an agent bot;

process the ongoing messages in real-time as the ongoing messages are received to automatically determine whether to present an opt-in authorization request for supplemental communications, wherein the opt-in authorization request includes a prompt for contact information associated with the user;

generate an instruction to present the opt-in authorization request, wherein when the instruction is received by the agent bot, the agent bot presents the opt-in authorization request through the first communications session;

monitor the first communications session in real-time to detect approval of the opt-in authorization request and a message including the contact information associated with the user;

facilitate a second communications session according to the contact information, wherein when the second communication session is facilitated, an integration bot transmits an opt-in confirmation request through the second communications session;

receive in real-time an opt-in confirmation responsive to the opt-in confirmation request through the second communications session; and provide the approval of the opt-in authorization request and the opt-in confirmation, wherein when the approval of the opt-in authorization request and the opt-in confirmation are received by a brand entity, the brand entity transmits the supplemental communications.

16. The non-transitory, computer-readable medium of claim 15, wherein the executable instructions further cause the computer system to:

identify in real-time an intent corresponding to the ongoing messages, wherein the intent is used to automatically determine whether to present the opt-in authorization request.

17. The non-transitory, computer-readable medium of claim 15, wherein the first communications session and the second communications session are distinct.

18. The non-transitory, computer-readable medium of claim 15, wherein the executable instructions further cause the computer system to:

activate the integration bot in response to the agent bot presenting the opt-in authorization request through the first communications session, wherein when the integration bot is activated, the integration bot automatically monitors the first communications session to detect the approval of the opt-in authorization request.

19. The non-transitory, computer-readable medium of claim 15, wherein the contact information corresponds to a phone number associated with the user, and wherein the second communications session is facilitated using Short Message Service (SMS) messages.

20. The non-transitory, computer-readable medium of claim 15, wherein the executable instructions further cause the computer system to:

dynamically update the agent bot in real-time based on the ongoing messages, the approval of the opt-in authorization request, and the opt-in confirmation.

21. The non-transitory, computer-readable medium of claim 15, wherein the first communications session is transferred to the agent bot from a live agent based on an intent associated with previous messages exchanged between the user and the live agent over the first communications session.

* * * * *